United States Patent [19]

Comer

[11] Patent Number: 5,801,945
[45] Date of Patent: Sep. 1, 1998

[54] SCHEDULING METHOD FOR ROBOTIC MANUFACTURING PROCESSES

[75] Inventor: Michael R. Comer, Sunnyvale, Calif.

[73] Assignee: Lam Research Corporation, Fremont, Calif.

[21] Appl. No.: 673,419

[22] Filed: Jun. 28, 1996

[51] Int. Cl.⁶ .................. G06F 19/00; G06G 7/64; G06G 7/66
[52] U.S. Cl. .................. 364/468.06; 364/468.01; 364/468.05; 364/468.08
[58] Field of Search .................. 364/468.05, 167.02, 364/167.1, 142, 174, 175, 176, 185, 401, 402, 403, 194, 468.01, 468.22, 468.24, 468.06, 468.07, 468.03, 468.08; 295/650

[56] References Cited

U.S. PATENT DOCUMENTS

| | | | |
|---|---|---|---|
| 4,608,643 | 8/1986 | Breitenstien et al. | 364/474 |
| 4,701,096 | 10/1987 | Fisher, Jr. | 414/416 |
| 4,807,108 | 2/1989 | Ben-Arich et al. | 364/148 |
| 4,896,269 | 1/1990 | Tong | 364/468 |
| 5,096,477 | 3/1992 | Shinoda et al. | 55/385.2 |
| 5,180,276 | 1/1993 | Hendrickson | 414/752 |
| 5,238,354 | 8/1993 | Volovich | 414/779 |
| 5,241,465 | 8/1993 | Oba et al. | 364/401 |
| 5,249,120 | 9/1993 | Foley | 364/401 |
| 5,347,463 | 9/1994 | Nakamura et al. | 364/478 |
| 5,408,405 | 4/1995 | Mozumder et al. | 364/151 |
| 5,444,632 | 8/1995 | Kline et al. | 364/468 |
| 5,450,346 | 9/1995 | Krummen et al. | 364/468 |
| 5,513,948 | 5/1996 | Bacchi et al. | 414/783 |
| 5,580,419 | 12/1996 | Berenz | 156/628.1 |

FOREIGN PATENT DOCUMENTS 07283093  10/1995  Japan.

*Primary Examiner*—Reba I. Elmore
*Assistant Examiner*—Ramesh Patel
*Attorney, Agent, or Firm*—Cesari and McKenna, LLP

[57] ABSTRACT

A scheduling method for robotic manufacturing processes that can be used in the processing of semiconductor wafers employs planning of dispatch times for wafers based on predetermined durations for some operations and estimated durations for other operations. Dispatch is based on the actual execution time for operations, but the planned order of operations is not changed. The planning of dispatch times is modified based upon the measurement of actual execution times of operations that were formerly estimated. Specific wafers are identified and a chain of custody is established during planning and dispatch.

12 Claims, 22 Drawing Sheets

SCHEDULING METHOD FOR ROBOTIC MANUFACTURING PROCESSES

FIELD OF THE INVENTION

This invention relates to a scheduling method for improving the efficiency of robotic manufacturing processes and more particularly to a method that improves the allocation of resources in a semiconductor wafer manufacturing facility.

BACKGROUND OF THE INVENTION

In complex robotic manufacturing processes, objects or workpieces are typically manufactured in a series of steps that are performed by discrete processing components. When every object undergoes the same series of steps, it is relatively easy to optimize the efficiency of the manufacturing process since the timing of each step is always predictable and objects can be moved around a processing facility in an unchanging order following a timeline that remains, essentially, unchanged.

The optimization of the manufacturing process becomes more difficult when objects each require differing types of process operations within a facility that are each performed for differing time durations. FIG. 1 illustrates a processing facility used in the production of semiconductor wafers 37. The particular facility comprises a cluster tool 20. The cluster tool 20 includes a central handling module 22 having a robot arm assembly 24 mounted on a rotating base 26 (curved arrow 28) so that a pair of end effectors or "paddles" 30 and 32 can be moved adjacent each of a plurality of semiconductor manufacturing modules that surround the perimeter of the handling module 22. The cluster tool 20 includes a first cassette 34 and a second cassette 36 that, each, provide unprocessed semiconductor wafers 37 and receive semiconductor wafers 37 after processing is complete. If a wafer originates from a cassette, that cassette is termed its "input location" and wafers are typically returned to the input location after processing. A series of process modules 38, 40, 42 and 44 are provided to perform various manufacturing processes on the wafers 37.

The cluster tool 20 is maintained in a clean room environment 70 and each of the modules operate under a high vacuum. Each module 38, 40, 42 and 44 is accessed via a respective isolation gate 72, 74, 76 and 78 that enables the module to be sealed at predetermined times from the handling module 22. Certain modules can be filled with process gas when sealed. Clearly, the paddles 30 and 32 must be removed from a given module before the isolation gate is sealed and the isolation gate must be opened prior to insertion of the paddles 30 and 32.

The types of process modules employed can include stripping modules 38 and 44 and etching modules 40 and 42. A cooling module 46 is provided to receive wafers 37 after heat-intensive processes have been performed. The cooling module is considered a process module for the purposes of this description. An aligner module 50 is also provided. Other process modules, such as deposition modules can be also incorporated into the cluster tool. The aligner 50 is used between process steps to correctly orient wafers 37 on the paddles 30 and 32 prior to the wafer's entrance into each of the process modules. The aligner includes a rotating capstan 52 and an edge detect mechanism 54 that determines the centering of the wafer when it is deposited on the capstan and that adjusts the relative position of the paddle 30 or 32 relative to the wafer 37 to insure that the wafer is centered on the paddle 30 or 32. In addition, each wafer 37 typically includes a notch or flat (not detailed). When required by certain modules, the capstan 52 rotates to place the notch or flat in a desired rotational orientation so that wafers enter process modules, from the paddle 30 or 32, in a known, standard rotational orientation.

In this example, the paddles are moved toward and away (double arrows 54) from the various handling modules by a series of arms 58, 60 and 62 having articulating joints that provide a moving pantograph-style support structure for the paddles 30 and 32. Each manufacturing module can include a separate control processor or subcomputer provided in the module chassis in this example, for controlling localized functions. In addition, the central handling module 22 can include its own subcomputer. The process modules 38, 40, 42 and 44, in particular, are controlled by their computers to perform predetermined processes to the wafers known as "recipes." Each recipe is composed of steps. Some steps have a predetermined time duration that is generally fixed. Other steps are variable in time duration. A time limit for variable steps is defined. Actual completion time for variable steps is often only 25–70% of the specified time limit. A number of parameters are used to determine the completion of a recipe. The actual completion time of a recipe may sometimes vary from the specified or predicted time.

Each of the process modules 38, 40, 42 and 44 can be programmed to perform a different, specified operation to a wafer. In a given production run, the cassettes 34 and 36 can provide wafers that undergo several different sets of process steps. The group of wafers that all undergo the same discrete group of process steps can be termed a "wafer set." One or more wafers can be included in such a set. Sets can be processed serially (e.g. all wafers in one set, followed by all wafers in another set) or, concurrently (e.g. wafers in each of two or more sets being handled at the same time by the process modules). Each time a wafer enters a module for an operation, it is termed a "visit." In either a serial or concurrent processing mode, process modules may be called upon multiple times to perform an operation on a given wafer in each set (e.g. several visits to the same module by a wafer). In some wafer sets, several process modules can be employed, while in other wafer sets only one or two process modules may be required. In summary, a typical production run, in which multiple wafer sets are processed, may require a substantial amount of wafer movement between modules. The freedom of such movement is, however, limited by scarce resources. For example, there are a limited number of process modules. There is only one aligner module, one cooling module and one robot assembly. Only one of the two paddles can operate at a given time since both paddles in this example are tied together and rotate simultaneously.

As described above, each cluster tool module, including the handling module 22, is controlled by a specific subcomputer. Each subcomputer is interconnected with a main control computer 80 that is, typically, provided at a remote location relative to the cluster tool 20. A user interface 82 which can include a display, keyboard, mouse and other input/output devices communicates with the main control computer 80. The dispatch of wafers and the parameters of procedures or recipes performed by process modules are instructed by the main control computer. In addition, certain movement functions of the robot arm assembly 24 are instructed by the main control computer 80 in conjunction with an on-board subcomputer or processor.

Further reference is made to FIGS. 2, 3 and 4 that illustrate a typical movement sequence for wafers according to the prior art. According to this example, the movement sequence includes inefficiencies due to lack of planning.

According to FIG. 2, a wafer 37A is withdrawn from the aligner 50 subsequent to completion of an alignment process by the paddle 30. Substantially simultaneously, the process module 42 is completing a process on another wafer 37B. The control computer 80 awaits receipt of a completion signal to instruct the robot arm assembly to withdraw the wafer 37B from the process module 42. It is assumed that the completion signal occurs while the alignment process of the wafer 37A is in progress. Hence, the robot arm 24 cannot immediately extract the wafer 37B from the process module. As such, the wafer 37B idles in the process module 42. As further detailed in FIG. 3, after a delay, the other paddle 32 is positioned adjacent the wafer 37B. Additional time elapses as isolation gates are opened to enable the paddle to enter and extract the wafer. Finally, as detailed in FIG. 4, the wafer 37B is moved to the aligner 50 for alignment while the already-aligned wafer 37A must await entry into the next process module (in this example the stripper 38). This is a highly simplified example, but it illustrates how minor delay can occur in shifting wafers between process modules when limited aligning and manipulating resources are available. Improper planning or no planning can lead to substantial down-time for often-used process modules. Extra steps, such as redundant opening and closing of isolation gates can occur without proper planning. In addition, it is possible that circumstances can arise where two wafers are entering and exiting the same process module at the same time, leading to "deadlock." It is, therefore, an object of this invention, to provide a method for efficiently scheduling robotic manufacturing processes, particularly suited to the manufacture of semiconductor wafers. This scheduling method should be applicable to cluster tool arrangements and other arrangements in which a manipulator, such as a robot arm, moves objects between process modules. The scheduling method should further optimize the use of scarce resources and insure that often-used modules are employed with minimal interruptions or down-time. In addition, the scheduling method should track wafers through operations, providing a chain of custody for each wafer, thus preventing deadlock and other processing errors.

SUMMARY OF THE INVENTION

In one embodiment, objects, comprising semiconductor wafers, are processed based upon a sequence of operations, wherein each operation is planned to occur over a specific period of time that comprises a starting time and a time duration. Specific resources that include, in this embodiment, a robot manipulator, robot paddles, and aligner and process modules are used to perform operations. There can be duplication of certain resources such as process modules so that more than one process module can perform a specified operation.

The timing of the operations that are performed to an object are planned to occur in a sequence that is free of overlap. In other words, operations can not have starting times and durations that fall within the starting time and duration of other operations using the same resource.

Resources that have custody of an object such as a paddle or process module are assigned to the object for a time duration that extends from the start of a movement of the object to the resource until the end of the moving of the object from the resource. Operations according to the plan are dispatched in order of their starting times. Dispatch occurs only when previous operations for a given object have been completed.

The last operation to occur to an object is planned to occur as soon as possible. The first operation for the object is then planned to occur as late as possible without varying the timing of the last operation, given known and predicted time durations for all operations to be performed to that object.

Planning occurs incrementally by planning start times for the first object and then creating provisional plans for start times for the next object. Provisional plans are created upon completion of each operation for the first object, constantly updating start time for operations of the next object. If the first operation in the provisional plan starts before the next unstarted operation for objects already planned, then the provisional plan for the next object is added to operations that are performed during the dispatch phase. In planning, some operations (such as those that occur in process modules) are measured based on actual completion times for these operations. The actual durations are averaged and these averages are used for planning future operations to be performed to objects when the operations are the same as the operations for which average duration times have been derived.

Sets of objects can be defined. Sets are based upon groups of objects having the same series of operations performed to all objects in the group. Two or more sets are processed according to a priority. The priority is established in decreasing order of the use of the next wafer of the set will make of resources. This prioritization occurs in decreasing order of the resources' total usage. Objects that make use of these resources are assigned priority based upon which resource they use. In other words, if a next object makes use of the resources with the greatest remaining usage, then it is assigned first priority. If, however, an object only makes use of a resource having a low remaining total usage, then it is assigned a low priority and it does not enter into the plan until after higher priority items have been "slotted."

When two or more sets are being processed, provisional plans are created for the next object of each set upon completion of each operation for earlier objects. Provisional plans are created in order of the priority of sets (as already described). Each provisional plan avoids conflict with resources already allocated, including those allocated by the provisional plan for the next object of higher priority sets. If the first operation in the provisional plan with the earliest start time of all provisional plans starts before the next unstarted operation of objects already planned, that provisional plan is added to the operations that are performed during the dispatch phase.

BRIEF DESCRIPTION OF THE DRAWINGS

The foregoing and other objects and advantages of the invention will become more clear with reference to the following detailed description as illustrated by the drawings in which.

DETAILED DESCRIPTION

The scheduling procedure according to this invention provides improved timing for the dispatch of workpieces to be processed by a multi-tool system. In this particular example, the workpieces are semiconductor wafers and the processing system is a semiconductor processing facility that can be organized as a cluster tool. The concepts described herein are applicable to a variety of processing systems in which scarce resources must be allocated for the handling and processing of workpieces.

According to this invention, the order of operations among wafers is first planned and then wafers, and their underlying operations, are dispatched according to the planned order. Planning involves a production of a timetable that contains an entry for each wafer. The wafer's entry specifies the operations to be performed for the given wafer, the planned starting time for each operation, and the duration of each operation. Some operations have variable times, such as process module operations. These are based upon the time required to perform a given "recipe" or process operation. Other operations, such as alignment and robot arm movement are generally known and constant. Robot arm operations generally comprise arm movement, "pick" and "place". A "pick" operation involves the removal of a wafer from a module and transfer of the wafer to an end effector or "paddle" of the arm. A "place" operation involves the transfer of a wafer from the paddle to a location in a process module. As used herein, the term "module" can refer specifically to a process module or, more broadly, to any resource used for manufacturing wafers or other objects according to this invention, such as manipulator "modules", cassettes and aligner "modules."

Figure 5:
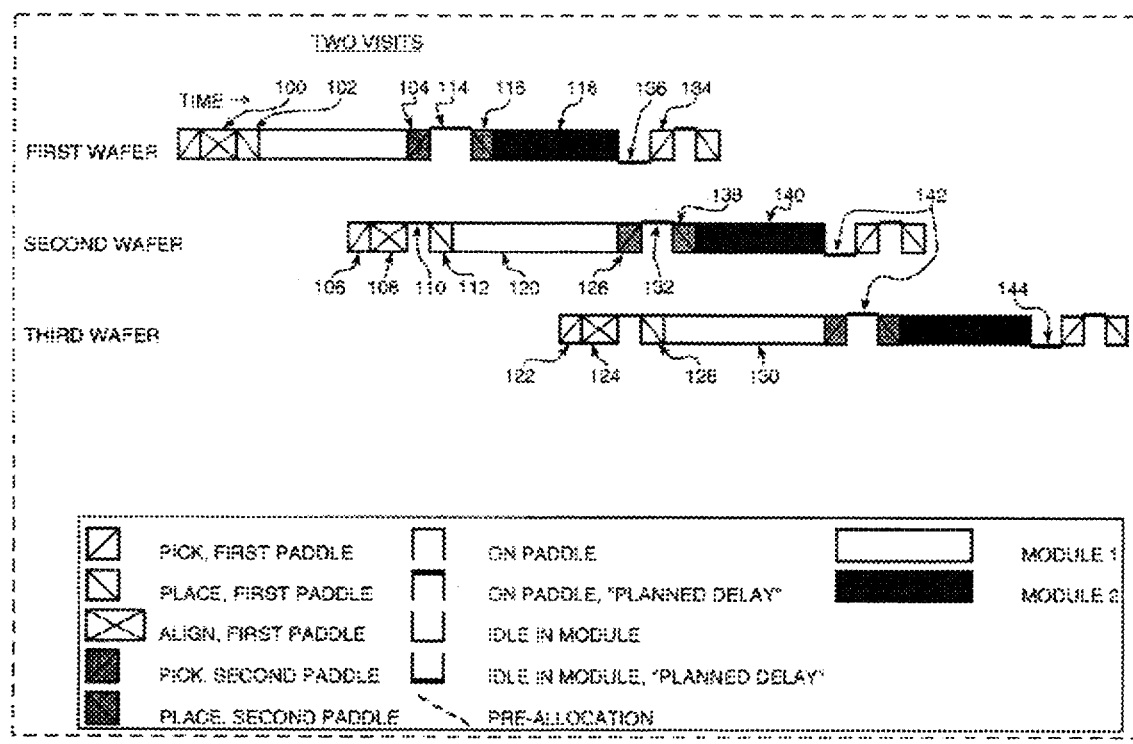
FIG. 5 is a timing diagram of an example of a planned process according to this invention in which three wafers in a set make visits to each of two process modules.

FIG. 5 illustrates a basic timing sequence that can be obtained by planning according to this invention. Reference numbers shown in parenthesis indicate the sections of each time span being described. The first wafer is aligned (100) and placed (102) by the first paddle into Process Module 1. An operation is performed for a specified time duration until completion. The second paddle then picks (104) the first wafer 1 from Process Module 1. Prior to the pick by the second paddle, the first paddle engages wafer 2 with a pick (106) and aligns (108) the second wafer 2. The second wafer idles briefly (110) on the first paddle while the second paddle performs its pick (104) of the second wafer 1 from module 1. Note that the second pick (106) and align (108) operations occur just in time to perform a "swap" of the first wafer with the second wafer in Process Module 1. Hence, with the entrance isolation gate still open, the first paddle is brought into Process Module 1 and a place (112) of the second wafer in Process Module 1 occurs. Meanwhile, the first wafer idles on the second paddle (114). The second wafer is then placed (116) into Process Module 2 (118) while the second wafer is processed (120) in Process Module 1. The operations in both Process Modules 2 and 1 end at roughly the same time. Before either process ends, the third wafer is retrieved from the cassette with a pick command (122) and aligned (124) on the first paddle. The second paddle picks (126) the second wafer out of Process Module 1 and a swap occurs in which the third wafer is placed (128) in Process Module (130). The second wafer idles (132) on the second paddle awaiting a pick and place (134) of the first wafer into the cassette. Note that a planned delay (136) occurs prior to the pick and place (134) of the first wafer. The first wafer awaits removal within Process Module 2 since the robot arm paddles are already occupied with the second and third wafers. During the pick and place (134) the second paddle places (138) the second wafer in Process Module 2 (140), and both the second and third wafers undergo processing until a similar swap 142 occurs in which the second wafer is deposited in the cassette and the third wafer finishes its process step in process module 2. A similar idle delay 144 is provided for the third wafer since further wafers may be undergoing similar processes. In this example, proper planning of start times has minimized delays from opening and closing the entrance isolation gate and has also ensured that both Process Modules 1 and 2 stay in relatively constant use.

Figure 6:
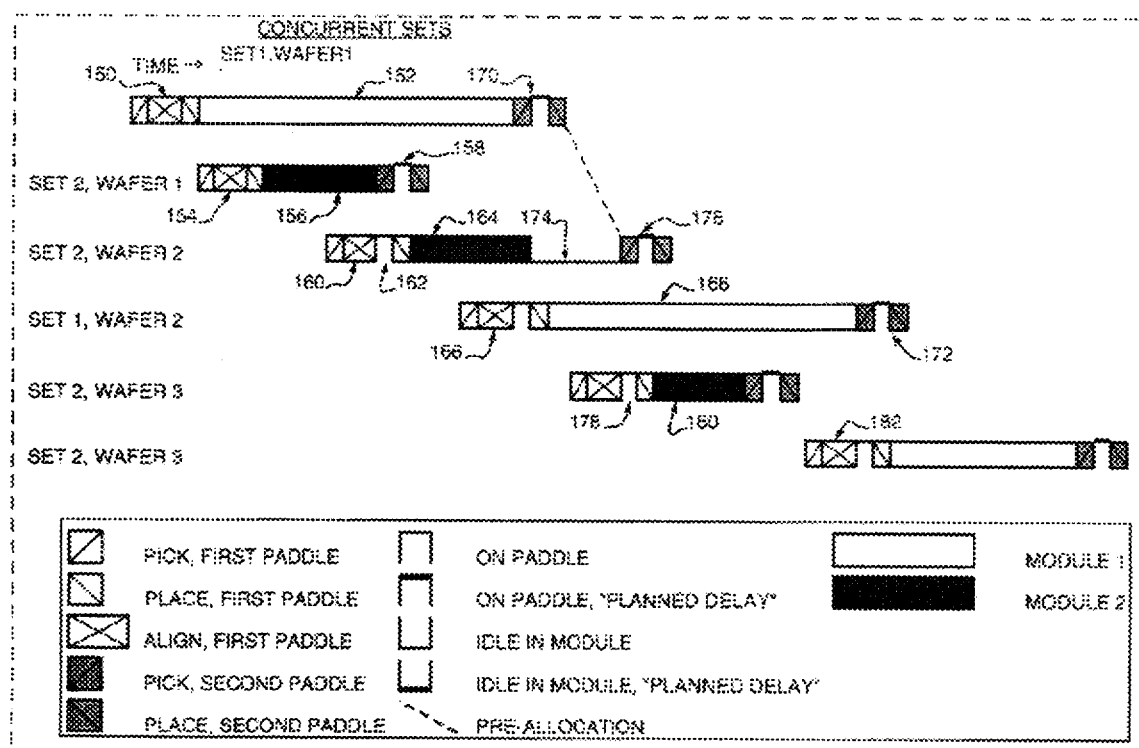
FIG. 6 is a timing diagram of an example of a planned process according to this invention in which two sets of wafers make concurrent use of two different process modules.

FIG. 6 details a more complex example in which two sets of wafers each having multiple wafers in that set, are processed simultaneously. Set 1, wafer 1 is retrieved from the cassette, aligned and placed (150) in Process Module 1 (152). While set 1, wafer 1 is processed (152) the robot arm immediately retrieves, aligns and places (154) set 2, wafer 1 into process module 2 (156). The duration of the process in Process Module 2 is relatively short and, before completion of the process for set 1, wafer 1 in Process Module 1 (152) a pick and place by the second paddle (158) occurs. Set 2, wafer 1 is, thus, deposited in the cassette. With knowledge of the end time of the process of set 2, wafer 1 by Process Module 2, an alignment operation occurs (160) for set 2, wafer 2 using the first paddle. After a brief idle 162 on the first paddle, set 2, wafer 2 is then swapped into Process Module 2 (164). As the planned process time of set 1, wafer 1 in Process Module 1 (152) nears expiration, set 1, wafer 2 is retrieved and aligned (166), and placed by the first paddle into process module 1 (168) subsequent to removal of set 1, wafer 1 by the second paddle (170). Set 1, wafer 2 undergoes processing until its removal by the second paddle (172). Note that set 2, wafer 2 is not removed from Process Module 2 immediately. Rather, an idle time (174) within the process module occurs. This is based upon "preallocation" of the robot arm to this removal step (176). In other words, the removal step (176) for set 2, wafer 2 is planned to occur when set 2, wafer 3 can be swapped by action of the first paddle (178). Set 2, wafer 3 then proceeds with processing in Process Module 2 (180). Set 1, wafer 3 is aligned (182) and proceeds after removal (172) of set 1, wafer 2. Preallocation is a form of planned delay. In general, the preallocation value for a process is 0. However, for a pick from a Process Module ending the first visit, where there is more than one module for the visit, then the value for preallocation will be the sum of the pick/place operation's duration and the align duration. Thus, a space for the timing of a pick and align of a subsequent wafer is enabled. This allows a "steady state" flow of wafers to occur. Preallocation is described further below.

As described further below, the actual dispatch time can vary from the planned time so that operations begin when resources become available. This is the opposite of a planned delay.

Figure 7:
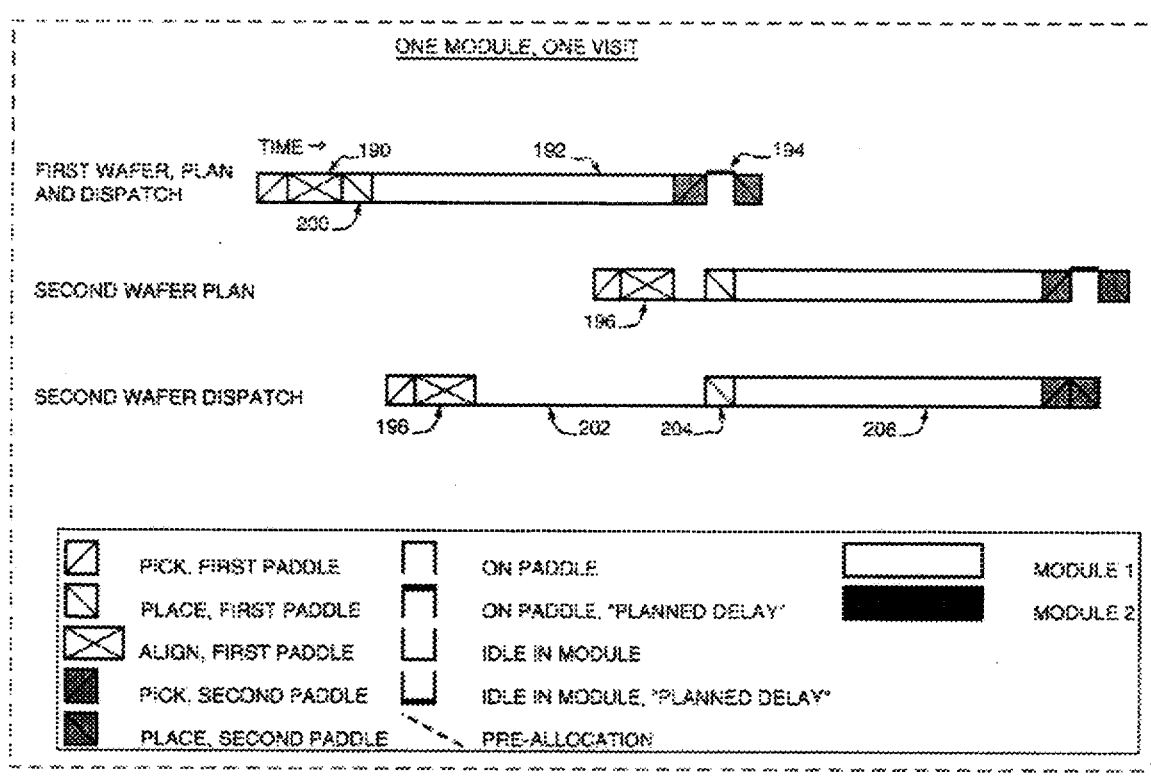
FIG. 7 is a timing diagram of an example of a planned process according to this invention in which the dispatch time for a wafer differs from the planned time.

FIG. 7 illustrates a single set of two wafers in which the first wafer is aligned (190) and placed in Process Module 1 (192). The second wafer has a planned dispatch just subsequent to removal of the first wafer. Alignment (196) is planned to occur just prior to the pick portion of the removal process (194). However, the scheduling procedure according to this embodiment includes start time resetting procedures (described further below) that enable the start time to be moved to the earliest possible time for a given process. In this example, the second wafer is dispatched and aligned (198) subsequent to the place (200) of the first wafer in Process Module 1. The procedure has determined that no conflicting use of the first paddle will occur during the processing of the first wafer. Hence, the second wafer is allowed to idle (202) on the first paddle until the first wafer is removed from Process Module 1 by the second paddle (194). The second wafer is then placed (204), by the first paddle in Process Module 1 (206), which is now free to use.

Figure 8:
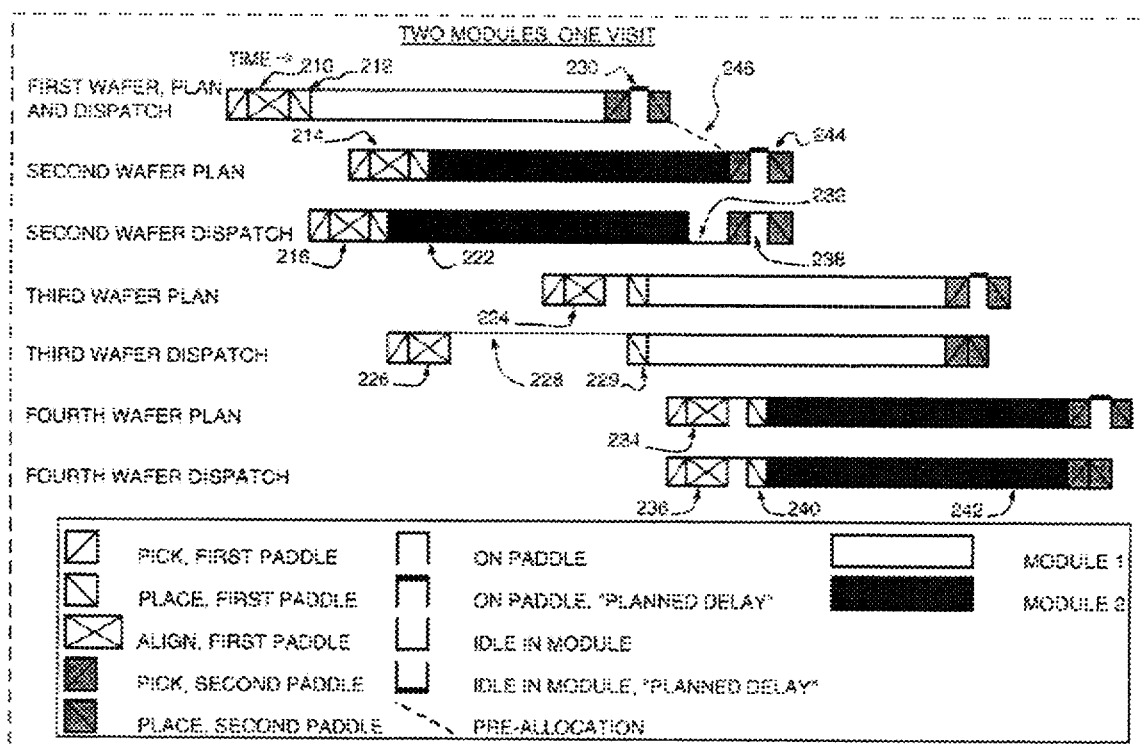
FIG. 8 is a timing diagram of an example of a planned process according to this invention in which the actual dispatch time and planned dispatch time of four different wafers are compared.

FIG. 8 illustrates a more complex example of early dispatch. The first wafer is aligned (210) and placed into Process Module 1 (212) by the first paddle. A second wafer is planned for dispatch starting with the alignment step (214) while the first wafer is processed by Process Module 1. The procedure identifies a delay in dispatching the second wafer that can be shortened. Thus, the actual dispatch of the second wafer occurs earlier with an alignment step (216) that begins just subsequent to the place (220) of the first wafer in Process Module 1. The second wafer is then moved to Process Module 2 (222) just after the alignment step (216). The procedure then identifies a further delay between the planned alignment time (224) and an earlier time (226) in which alignment can occur. Hence, the robot arm aligns the third wafer and stores it on the first paddle (228) since no other procedure would conflict with this operation. The third wafer is placed (229) in Process Module 1 during a swap in which the first wafer is removed (230) from Process Module 1. The removal of the first wafer utilizes the second paddle. The second wafer is allowed to idle (232) in Process Module 2 until the fourth wafer can be aligned (234) on the first paddle. Note that the planned alignment (234) and the actual alignment (236) occur at the same time. The second wafer is removed (238) during a swap in which the fourth wafer is placed (240) in Process Module 2 (242). Note that the planned removal (244) of the second wafer is part of a preallocation (246). The actual removal (238) occurs at the same time based upon the procedure due, in part, to the planned swap with the fourth wafer.

Having described some basic timing considerations, references now made to FIGS. 9–21 which, generally, describe the scheduling procedure according to this invention.

Main Procedure

Figure 1:
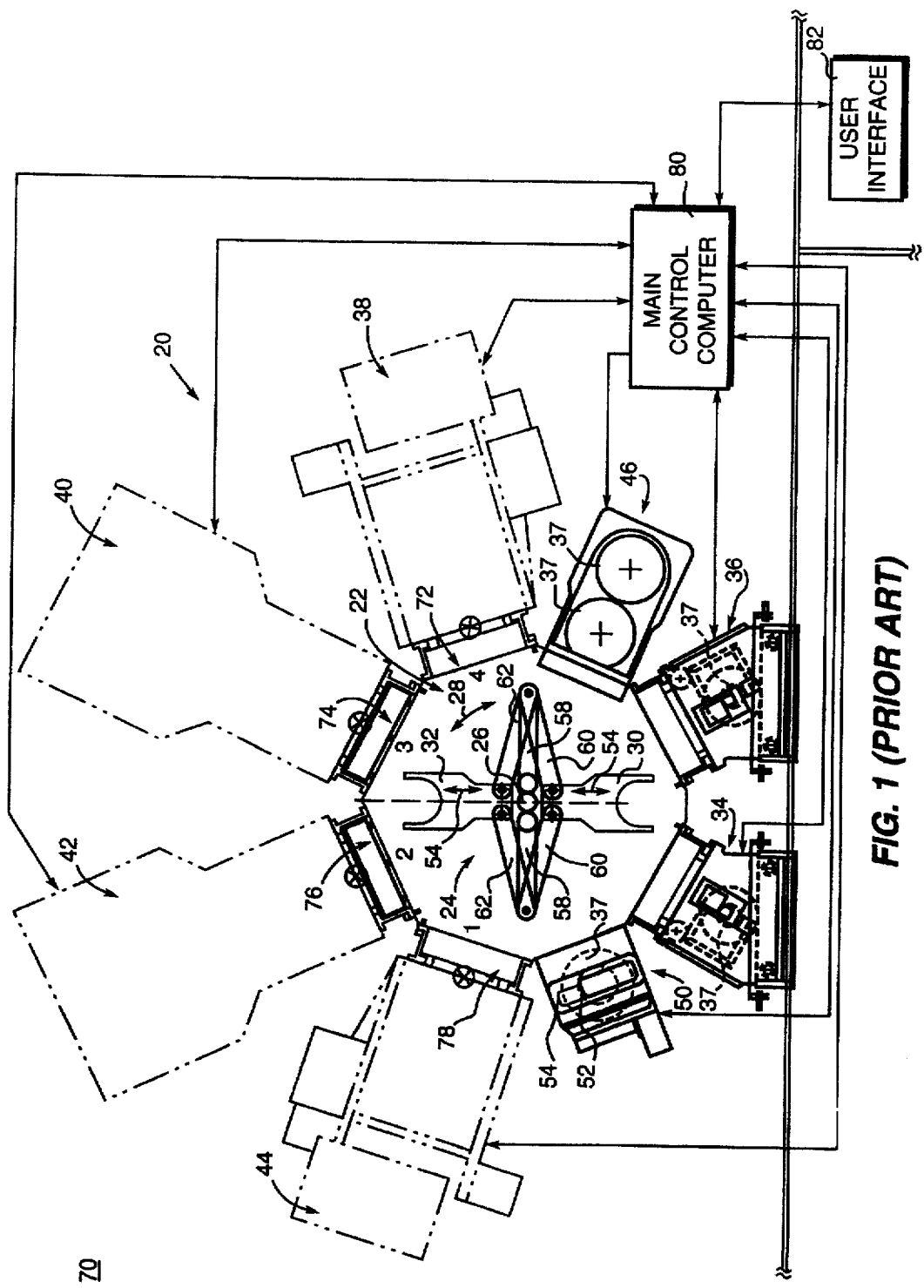
FIG. 1, already described, is a schematic plan view of a typical multi-process module cluster tool for processing semiconductor wafers according to the prior art.
Figure 2:
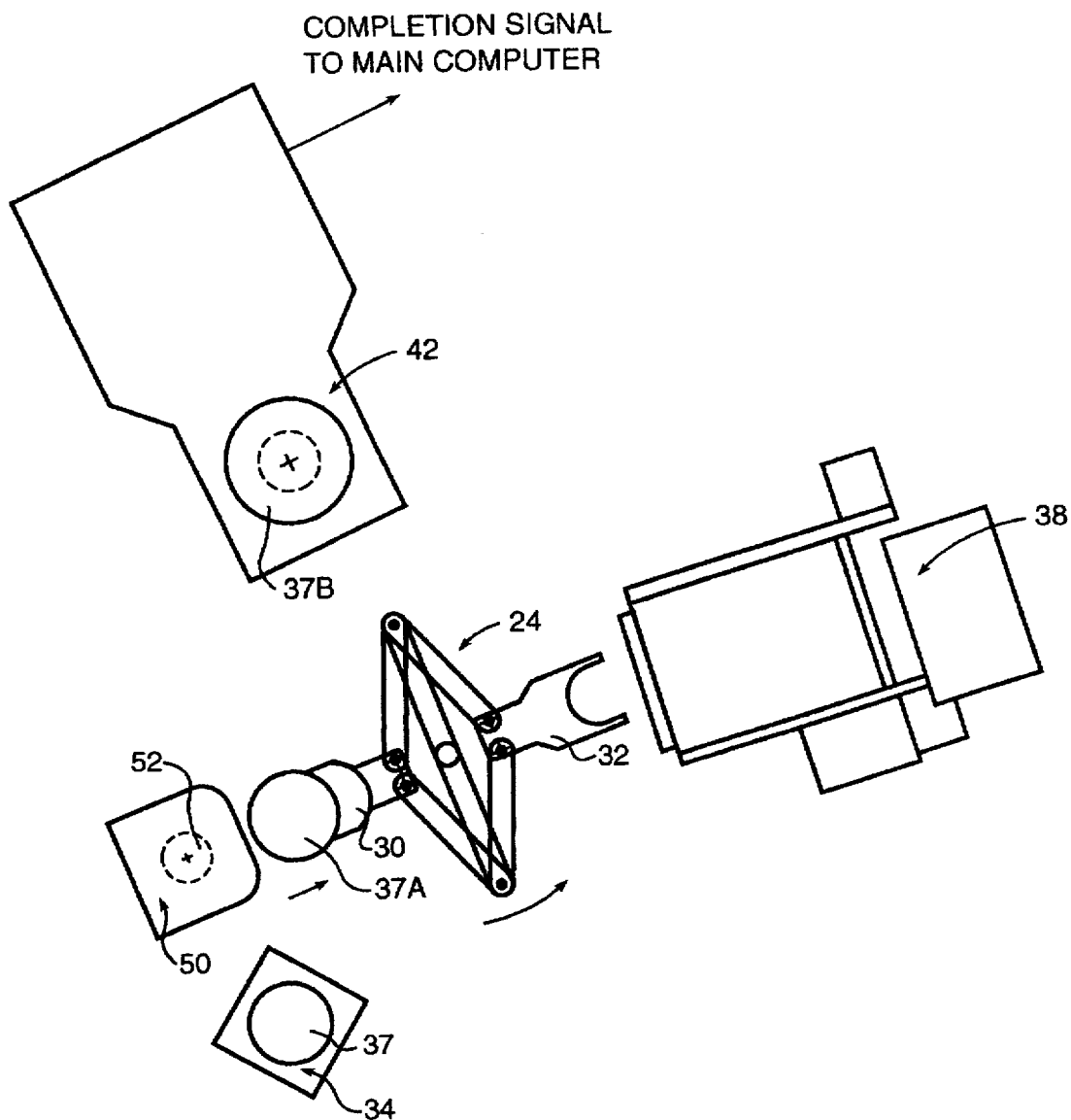
FIGS. 2–4, already described, are partial schematic plan views of exemplary processing steps for the cluster tool of FIG. 1 according to the prior art.
Figure 3:
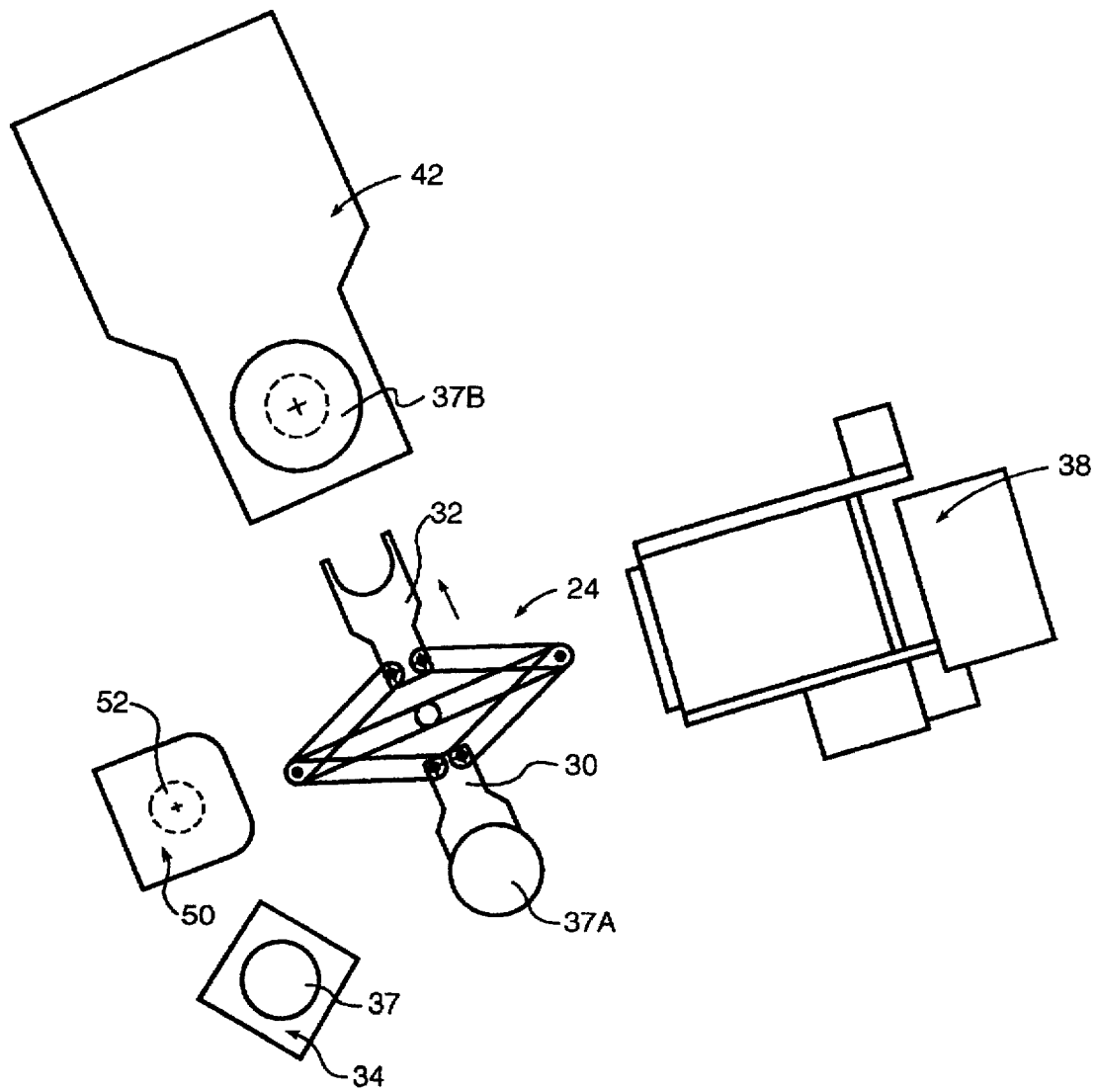
Figure 4:
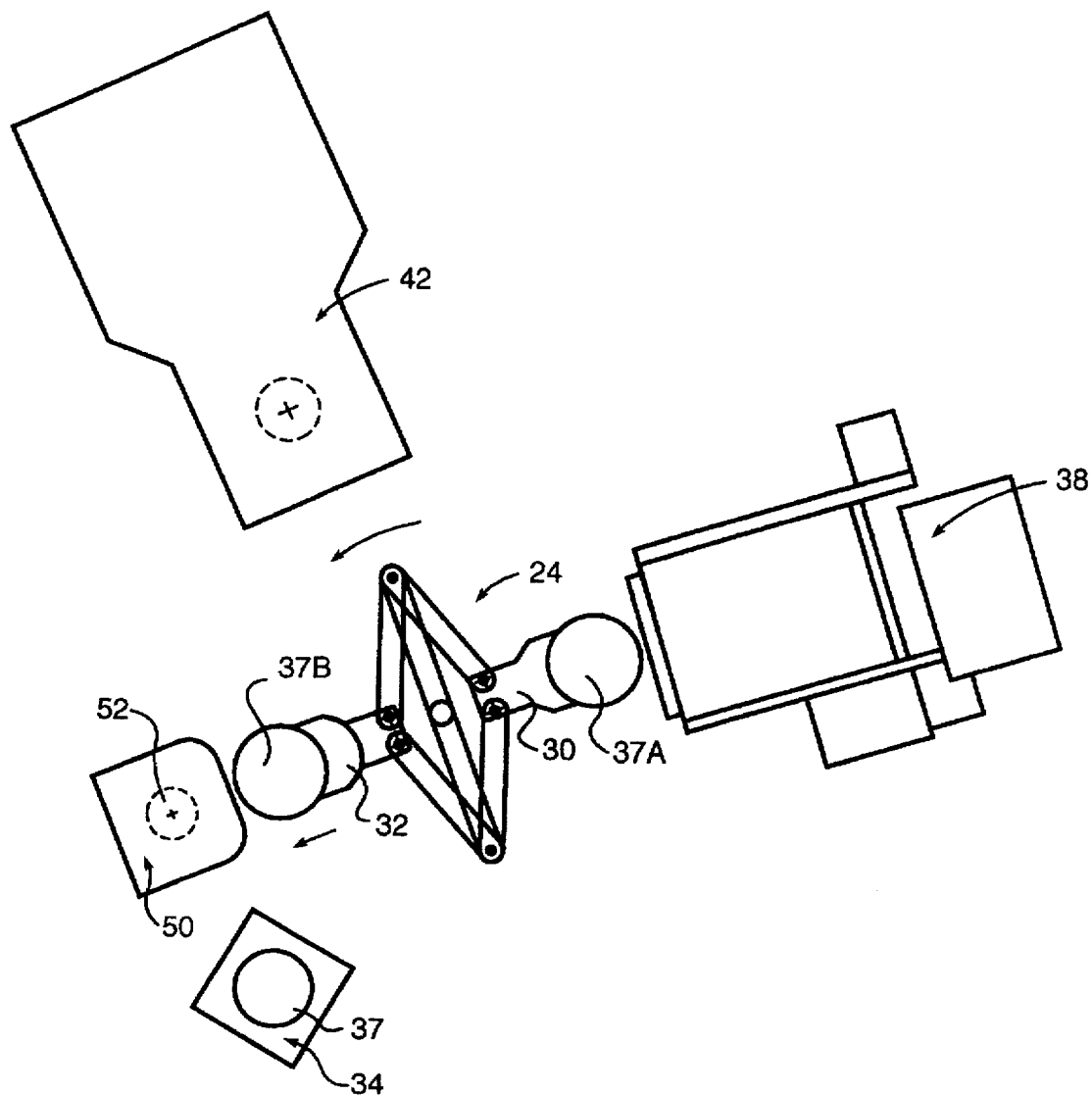

The main control computer 80 (FIG. 1) performs the scheduling procedure according to this invention as part of its normal function in dispatching and handling wafers. It accesses information related to process module procedures (recipes) and the time deviation for those procedures. A user programs recipes and sets up a production instruction list for producing one or more wafer sets. The wafer sets are produced in accordance with the schedule provided using information already present and derived during the production process. As noted above, the scheduling method described herein is applicable to any manufacturing process in which objects or workpieces undergo manufacturing processes by discrete processing units that are accessed by handling units or manipulators. Accordingly, while this description makes reference to "wafers", this term shall be deemed to include any objects or workpieces. In addition, while the term "align" and "alignment" are used, any relatively short manufacturing procedure or process can be substituted therefor. Pick and place procedures can be considered to be generalized loading and unloading operations by a manipulator to various processors.

Figure 9:
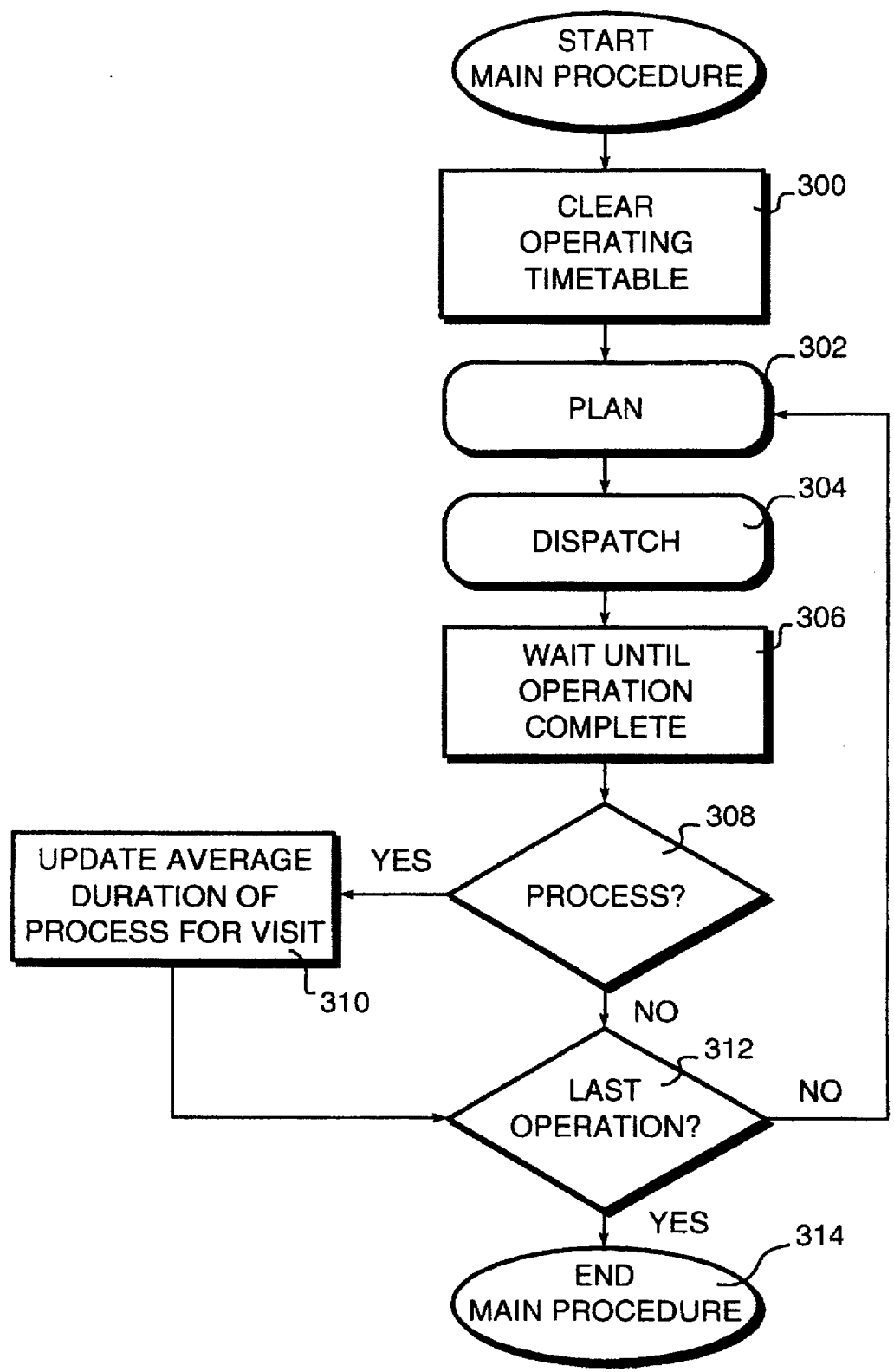
FIG. 9 is a flow diagram of the main scheduling procedure according to this invention.

FIG. 9 details the main scheduling procedure according to an embodiment of this invention. In beginning a production run, the operating timetable is first cleared as described by block 300. The procedure then begins the planning of operations as shown by block 302. Subsequent to planning, operation dispatch instructions are transmitted, and operations are dispatched as indicated by block 304. Typically, a first operation is dispatched individually. However, a group of operations can be dispatched simultaneously if resources are not in conflict with each other. The procedure awaits completion of at least one operation as shown by block 306. Following completion, any operations involving a process that includes a recipe or other time-variable function are routed by the decision box 308 to a time measurement procedure as indicated by block 310. The average duration for the particular recipe is determined and an update of the average is made, if necessary. For either a process or non-process step, another decision box 312 then determines whether another operation is still required. If the last operation has not occurred, then the procedure returns to the planning procedure (block 302) to continue the planning function. The process repeats itself until all operations are performed and the main procedure ends (block 314).

I. Planning

Planning occurs continuously during a wafer production run. As detailed in FIG. 10, the planning procedure consists of several sub-procedures. The planning procedure first queries whether any unprocessed wafers remain as shown by decision block 320. If no unprocessed wafers remain, then the planning procedure ends (block 322) and the remaining operations on a given wafer are performed in succession as previous operations are completed. If any unprocessed wafers remain, then the procedure first calculates the usage of each of the modules in the system, based upon time duration (block 324). This procedure is described in further detail below. The planning procedure then maps the allocation of resources as shown by block 326. In other words, each of the cluster tool's resources (robot, process modules or aligner) are allocated to a given wafer at a given time. The details of this procedure are described further below.

Following the mapping of resource allocation, a planning timetable is built as shown by block 328.

The planning timetable entry for each wafer is a sequence of operations that follow the wafer from its input location (a cassette) through the various operations performed on the wafer as specified by its "flow" to its eventual disposition at the output location (a cassette). The basis of timetable construction involves the scheduling of operations so that start times and planned operation durations do not overlap when two operations use the same resource. In other words, the same paddle or process module is not generally occupied by two wafers at the same time. It is, however, contemplated that the planning timetable can be constructed with operations of one entry overlapping operations of another, as use of the same resource does not overlap. The operating timetable is the basis for the dispatch and performance of operations by the various process modules. The operating timetable receives at most one entry for each repetition of the planning procedure as detailed in block 330. The procedure ends in block 565.

A. Calculate Module Usage

Figure 11:
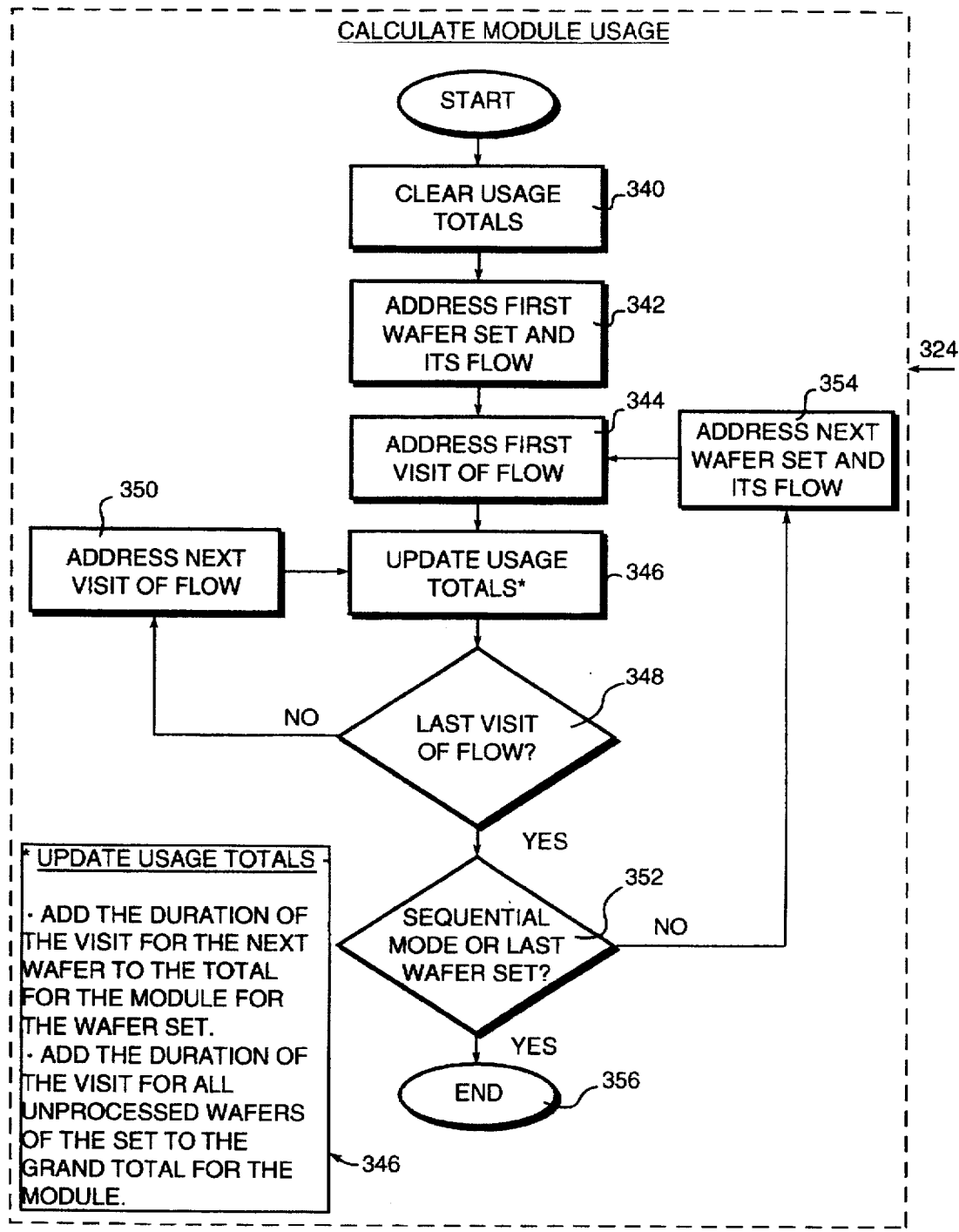
FIG. 11 is a flow diagram of the procedure for calculating module usage for the planning procedure of FIG. 10.

As described above, the planning procedure calculates the usage of various modules based upon time durations for each module's usage. FIG. 11 is a flow diagram of a procedure for calculating module usage. The procedure first clears registers containing past usage totals as shown by block 340. The first wafer set (e.g. a group of wafers all undergoing the same set of operations) is addressed and its flow (e.g. the procedures it will undergo) is addressed. In other words, a data area is created that identifies the wafer set and another data area, associated with the wafer set is identified that includes data relative to the flow. By "first wafer set" it is meant the first wafer set for which all operations have not yet been completed. Since planning occurs incrementally according to the main procedure (FIG. 9) as operations are executed, the identity of the first wafer set will change as all operations in a wafer set have been completed. At that time, the next incomplete wafer set becomes the "first wafer set." The first wafer set and its flow are addressed as shown by block 342. The procedure then addresses (e.g. identifies data related to and creates a data area) for the first "visit" of the flow. A visit is an introduction of a wafer into a process module. The first visit is addressed as indicated by block 344. The procedure then updates the usage totals for the modules as indicated by block 346. As shown in inset, the updating of usage totals requires adding the time duration of the visit for the next wafer to the total time duration in which a given process module is employed for a wafer set. The duration of the visit for all unprocessed wafers of the set is also added to the grand total of duration time of usage of the module.

The procedure then determines whether the last visit of the given flow has occurred as indicated by decision box 348. If the last visit of the given flow has not occurred, then data representing the next visit of the flow is addressed as indicated by box 350. The usage totals are updated based upon the data of this next visit until all visits have been addressed. When all visits of a flow for a given wafer set have been addressed, then the procedure determines whether the next wafer set and its flow are to be addressed. This decision, as shown in decision box 352, is based upon whether the given set is the last wafer set or wafer sets are to be processed sequentially rather than concurrently. If wafer sets are processed concurrently and further wafer sets must still be addressed, then the next wafer set and its flow is addressed as indicated by block 354 and the procedure returns to block 344 in which the first visit of the next wafer set flow is addressed. When all concurrent wafer sets and their associated flows have been addressed, then the procedure ends (block 356).

B. Map Resource Allocation

Figure 12:
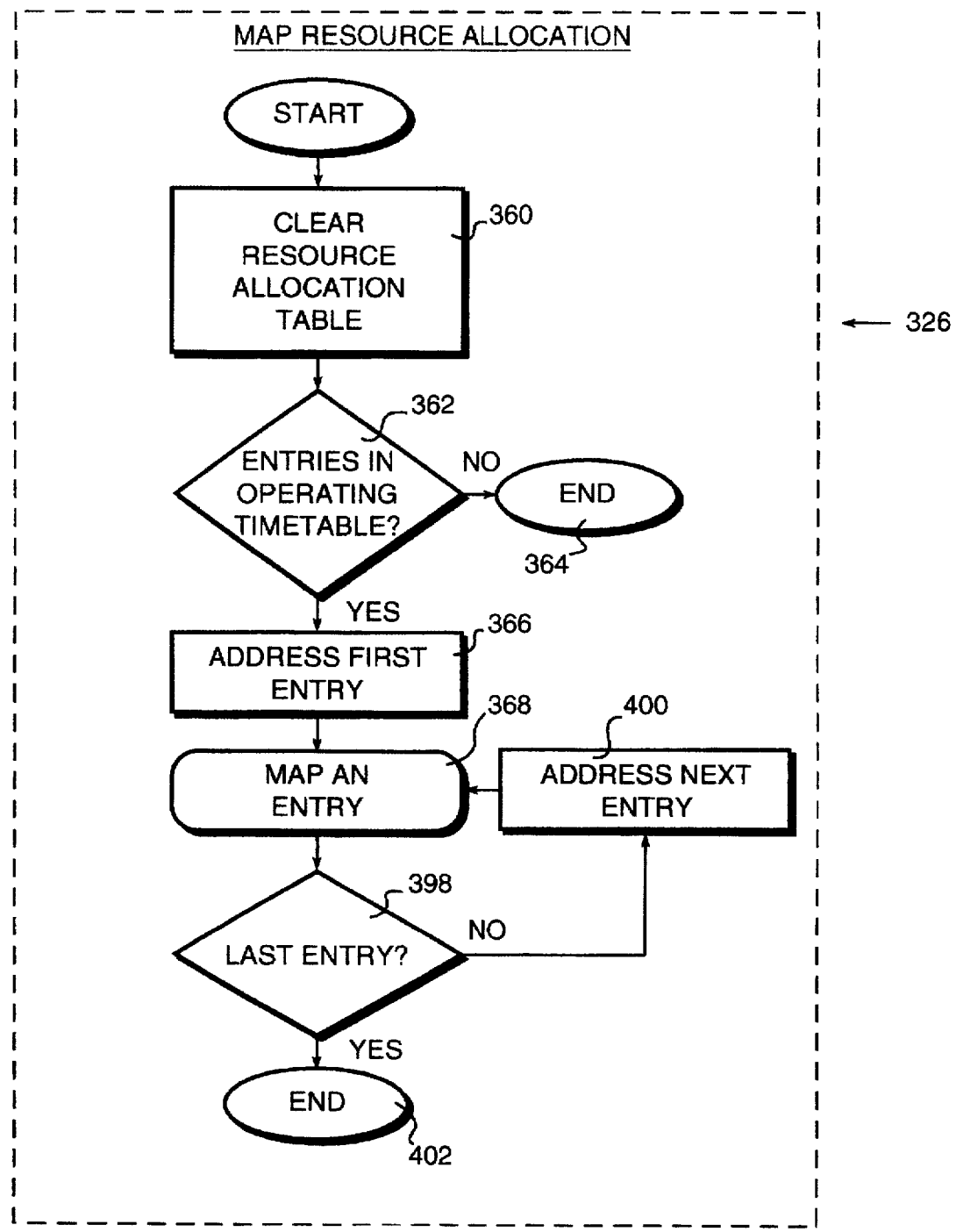
FIG. 12 is a flow diagram of the procedure for mapping resource allocation for the planning procedure of FIG. 10.

As described above, the planning procedure maps the allocation of resources as further detailed in FIG. 12. During the mapping procedure, existing resources are "mapped" by producing, for each resource, a list of "allocation periods" when the resource will be busy performing the planned operation or will be idle, but occupied by a wafer. In this embodiment, the resources are the robot, individual paddles, the aligner and individual process modules. Only paddles and process modules can be "idle but occupied by a wafer." For the robot, the allocation periods are from start time for a wafer through the sum of the start time and the planned duration for each pick, place or align operation. For a paddle, the allocation periods are from the start times for a pick operation with the paddle through the sum of the start time and the planned duration for the next place operation for the same wafer.

For the aligner, the allocation period is from the start time through the sum of the start time and the planned duration for each align operation. For a process module, the allocation period is from the start time for a place to the process module through the sum of the start time and the planned duration for the next pick operation from the process module. The procedure begins by clearing registers that contain prior resource allocation tables as indicated by block 360. The procedure then decides (decision block 362) whether any entries are present in the operating timetable. If no entries are currently present, then all resources are free for use and the procedure ends (block 364). If preexisting entries in the operating timetable are present, then the procedure addresses the first entry in the operating timetable (block 366). A mapping procedure then occurs as indicated by block 368. Each entry is mapped, in turn. The mapping procedure is further described in FIG. 14.

1. Map An Entry

Figure 14:
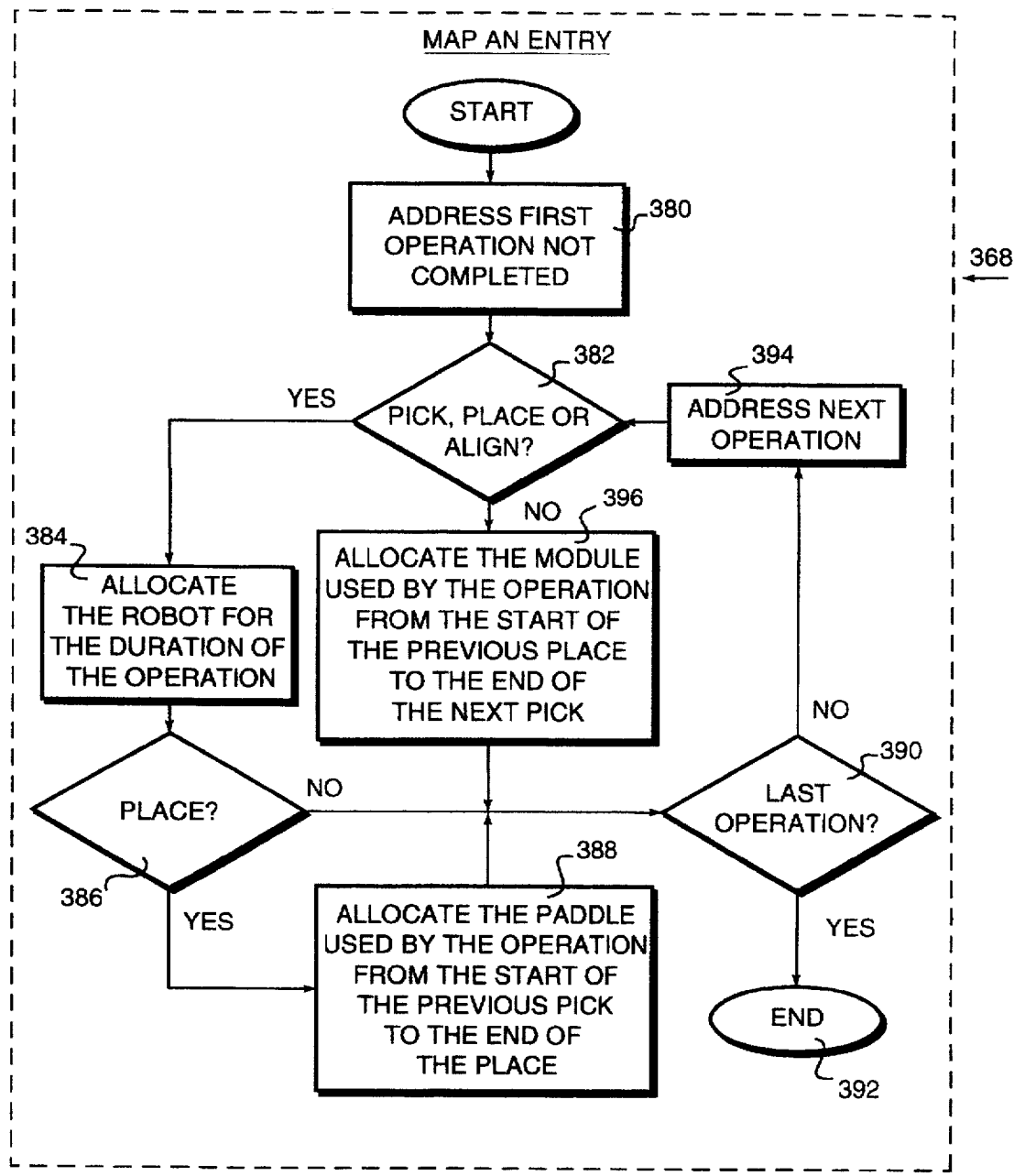
FIG. 14 is a flow diagram of the provisional timetable entries in which entries are mapped for the resource allocation mapping flow diagram of FIG. 12.

As detailed in FIG. 14, the entry mapping procedure identifies and addresses the first operation not completed as shown by block 380. Given the information contained in the address for this operation, the procedure determines whether a pick, place or align command is specified in decision block 382. If a pick, place or align is specified, then the robot manipulator will be used and it is, therefore, allocated as a resource for the duration of the operation. Note that the duration of a pick, place or align is typically a known value that does not vary. Allocation of the robot occurs as shown by block 384. A further determination is made in decision block 386 as to whether a place operation will be performed. If a place is to be performed, then the paddle to be used is identified in block 388. This identification occurs, according to this embodiment, since two paddles are used in the robot. It is contemplated that the two paddles in this embodiment cannot perform operations simultaneously, but they do allow two wafers to be contained on the robot at a given time. Clearly, modified robots in which two or more independently operating paddles are included will modify the mapping of entries. The time allocated to the given paddle is based upon the duration of the operation from the start of the previous pick of a wafer to the end of the place of that wafer.

Following an allocation of the paddle, or allocation of the robot if a place is not performed, the procedure then determines whether this is the last specified operation (decision box 390). If this is the last operation, then the mapping procedure ends (block 392). If further operations are specified, then the next operation is addressed in block 394. A determination is again made as to whether a pick, place or align operation will be performed in decision box 382.

If the operation performed is not a pick, place or align, having a known duration and involving the robot, then the procedure instructs allocation of the specific process module used by the operation as shown by box 396. The time allocated for the process module is assigned from the start of the previous place of a wafer into the module to the end of the next pick from the module once allocation has occurred as shown by block 396 for a given operation, then the procedure again queries whether more operations are specified (decision box 390). The mapping process continues until all operations have been addressed and resources have been allocated.

With reference again to FIG. 12, describing the mapping of resource allocation, the entry mapping procedure (block 368) is performed fully until all operations for a given entry corresponding to a wafer have been completed. The procedure then queries in decision box 398 whether any remaining entries for further wafers are present. For each new wafer, a new entry is addressed as shown by box 400. When all entries for all wafers have been mapped, (each with a corresponding set of operations as described above) then the resource allocation mapping procedure ends (block 402).

C. Build Provisional Timetable Entries

Figure 13:
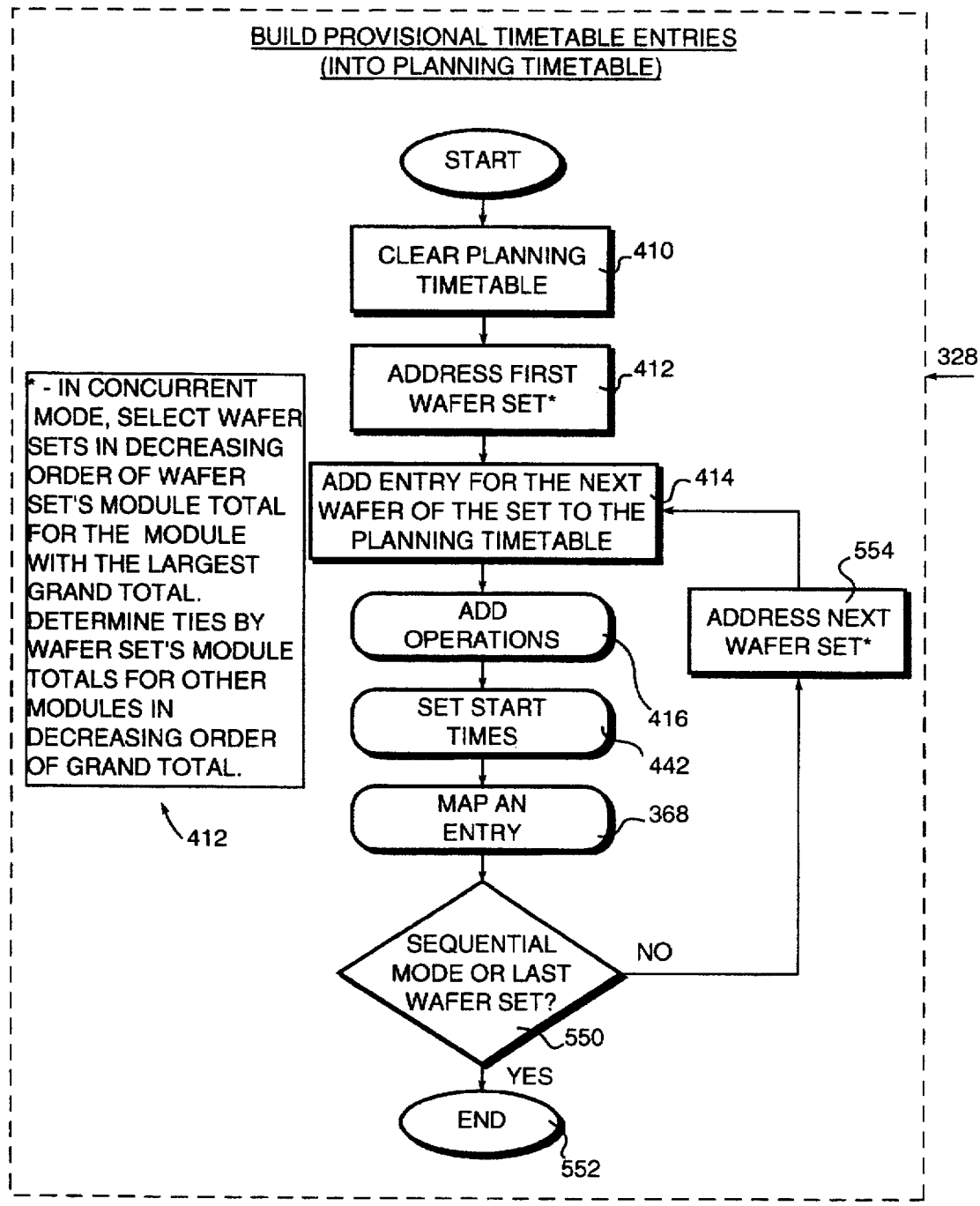
FIG. 13 is a flow diagram of the provisional timetable entries building procedure for the planning procedure of FIG. 10.

As described above with reference to FIG. 10, a planning timetable is constructed following the mapping of resource allocation in the planning procedure. FIG. 13 further describes the procedure of building a planning timetable using provisional timetable entries. Note that, on completion of each operation, entries into a planning timetable occur. When sets are processed sequentially, then there is one provisional entry relating to the next wafer in the current set. When concurrent sets of wafers are processed, however, there are provisional entries for the next wafer in each set. The provisional entry with the earliest starting time is added to the timetable if its first operation starts at or before any remaining operation in the timetable. According to this embodiment, the first provisional entry takes into account resource usage by the entries in the timetable. Subsequent provisional entries into the timetable also take into account resource usage by prior provisional entries. Priority for selection of wafer sets for entry into the timetable is established in decreasing order starting with the use that the next wafer of the set will make of the process module being used for the largest duration of time by all remaining wafers. In other words, wafers that use the most-continuously used process module receive first priority.

As detailed in FIG. 13, the provisional timetable entry building procedure is initiated by clearing the prior planning timetable as shown by block 410. The data related to the first wafer set (not yet completed) is addressed as shown by block 412. As noted in the detailed block 412, sets that are processed concurrently are selected for addressing according to a priority that decreases based upon the total use of each process module. This priority is described generally above. If priorities are "tied" then the total time duration for usage of other modules are then compared to break ties between wafer sets and establish a positive priority ranking. After addressing the first wafer set, the data for processing the first (or next) wafer of the set is entered into the planning timetable as shown by block 414. The building procedure then executes the Add Operations procedure (block 416). The Add Operations procedure enters the actual list of operations for the wafer into the planning timetable.

Figure 15:
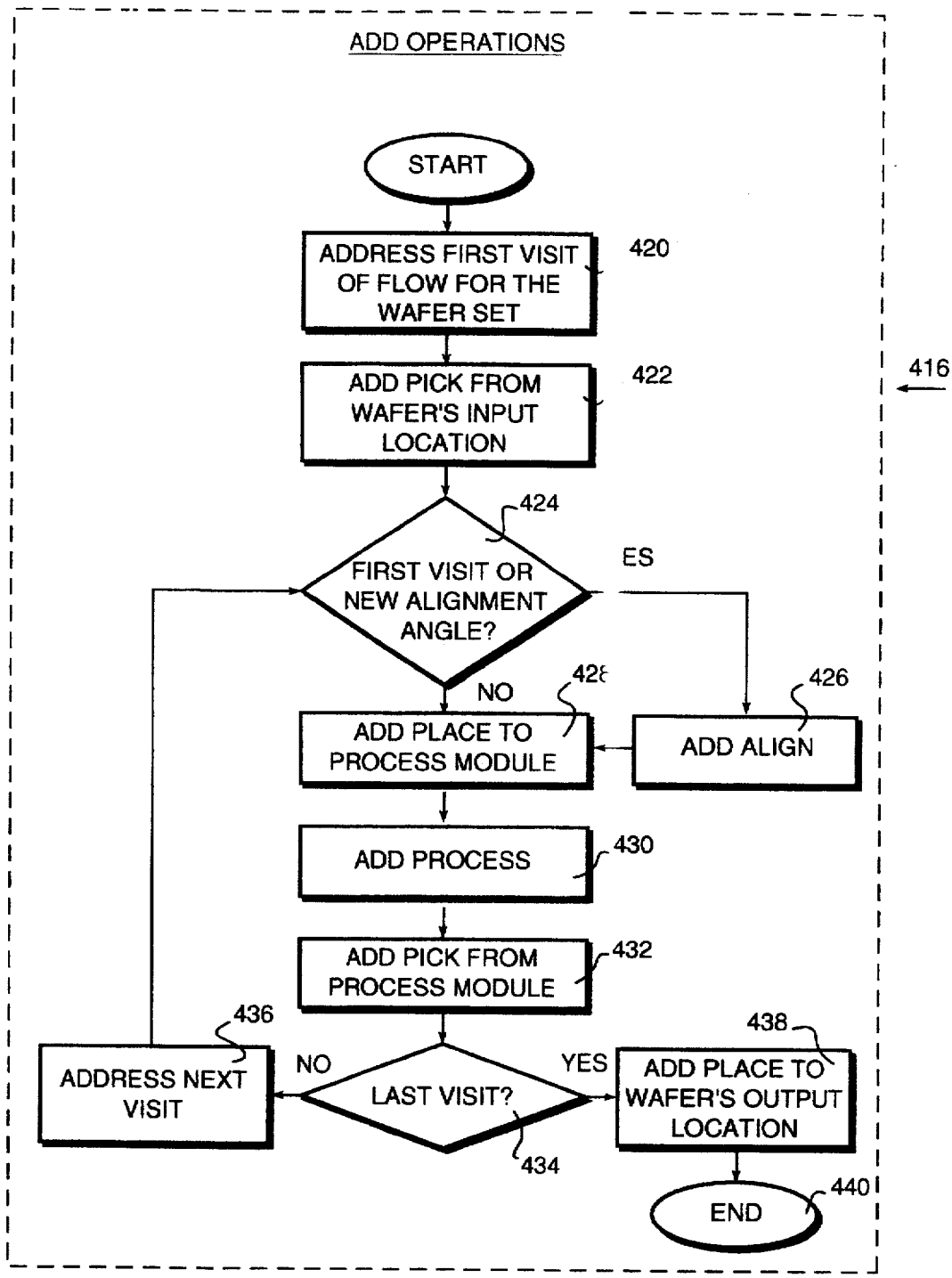
FIG. 15 is a flow diagram in which operations are added according to the provisional timetable entries building procedure flow diagram of FIG. 13.

With reference to FIG. 15, the Add Operations procedure is further detailed. The Add Operations procedure begins by addressing the first visit of the flow of the given wafer set (block 420). Data that indicates a pick operation is added to the timetable as shown by block 422. This added pick operation instructs the robot to retrieve a wafer from the input location (a cassette). If a first visit is indicated or, for later visits, a new alignment angle is specified, then the decision block 424 instructs a trip to the aligner by adding an alignment command as shown by block 426. For later visits, or after alignment instructions are added, then a place command is added as shown by block 428. The place command indicates the process module in which the wafer will be processed. The specific process or recipe is then provided as shown by block 430. A pick command from the specified process module is then provided as indicated by block 432. A decision box 434 determines whether more visits to further modules are specified. If so, then the next visit is addressed as shown by block 436 and the procedure is repeated starting with decision block 424, determining whether a new alignment angle has been chosen. When the last visit has been specified, then a final place command is added according to block 438. This place command identifies the output location (a cassette). The Add Operations procedure is then ended for the given wafer (block 440). With reference again to the planning timetable building procedure of FIG. 13, start times are set after operations are added to the timetable. Procedure block 442 defines the setting of start times and is further detailed in FIG. 16.

The Set Start Times procedure sets a working start time from the current time as specified by an on-board clock as shown by block 450. Each operation has a start time. When an operation has been built, the start times are set so that there is no conflict with operations already in the time table or in provisional entries. The first operation is set to start at or after the current time. All operations occur in a specified order with the last operation starting as soon as possible and the first operation starting as late as possible without delaying the last operation. The Slotting procedure is then performed, as indicated by block 452. Slotting schedules the operations for each wafer so that the operations occur without conflicting with other previously planned operations and so that the last operation of the entry for a wafer occurs as early as possible. The Slotting procedure is described further below. After slotting is performed for a given wafer, the Shifting procedure, as indicated by block 454 is executed. Shifting moves operation so that they occur as late as possible without skipping over previously planned operations using the same resources. Shifting can be omitted according to an alternate embodiment of this invention. The Shifting procedure is employed to further speed processing. The Shifting procedure is also described further below. After Shifting, the start times derived from Slotting and Shifting are saved as indicated by block 456. A working start time is then stored. The working start time is set to the sum of the first operation's start time and one time increment as indicated in block 458. The Slotting procedure then occurs again in block 460 in view of the new working start time. The procedure then determines if the start time for the last operation has been changed in decision box 462. If the last start time has not been changed, then the procedure returns to the Shifting procedure of block 454. If, however, start time for the last operation has changed then the prior start times are restored as indicated by block 464. When a delay or change of the start time finally occurs through iteration of the Shifting and Slotting procedure, then the last start time that does not create such a delay then the final grouping of start times that creates no such delay in the last operation is selected. At this time, the procedure ends (block 466).

1. Slotting

Figure 16:
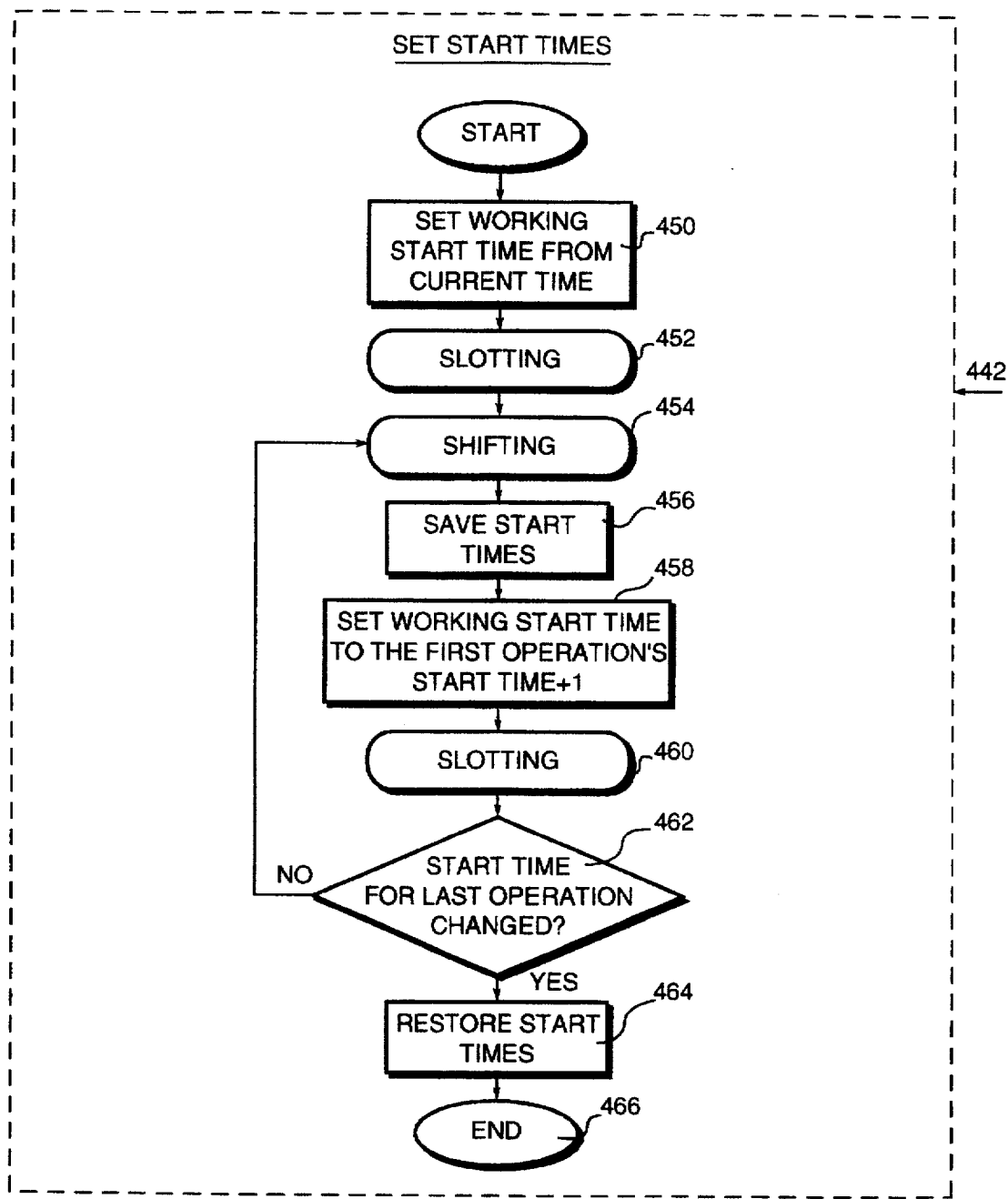
FIG. 16 is a flow diagram in which start times are set according to the provisional timetable entries building procedure flow diagram of FIG. 13.
Figure 17:
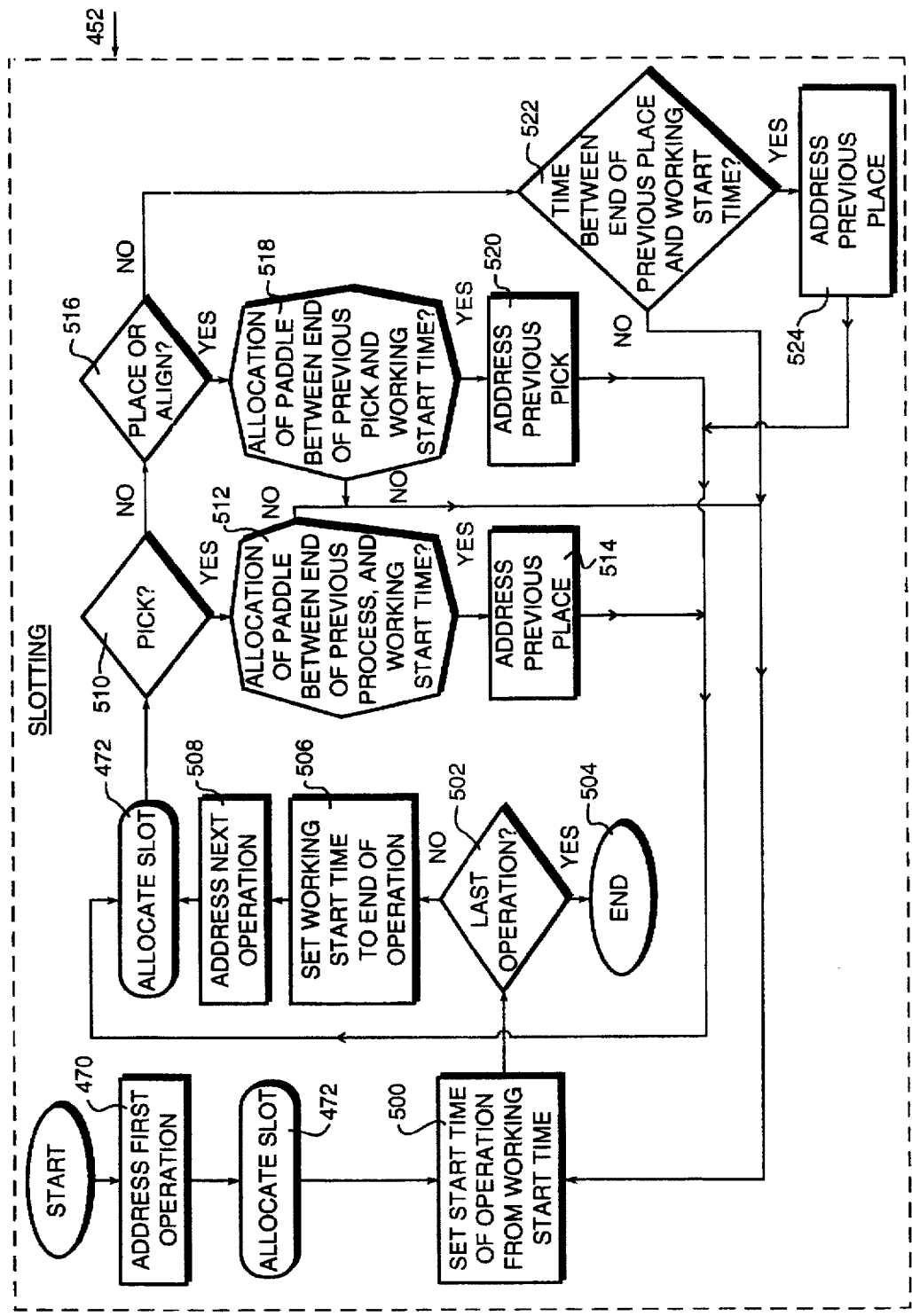
FIG. 17 is a flow diagram in which slotting occurs according to the start time setting flow diagram of FIG. 16.
Figure 18:
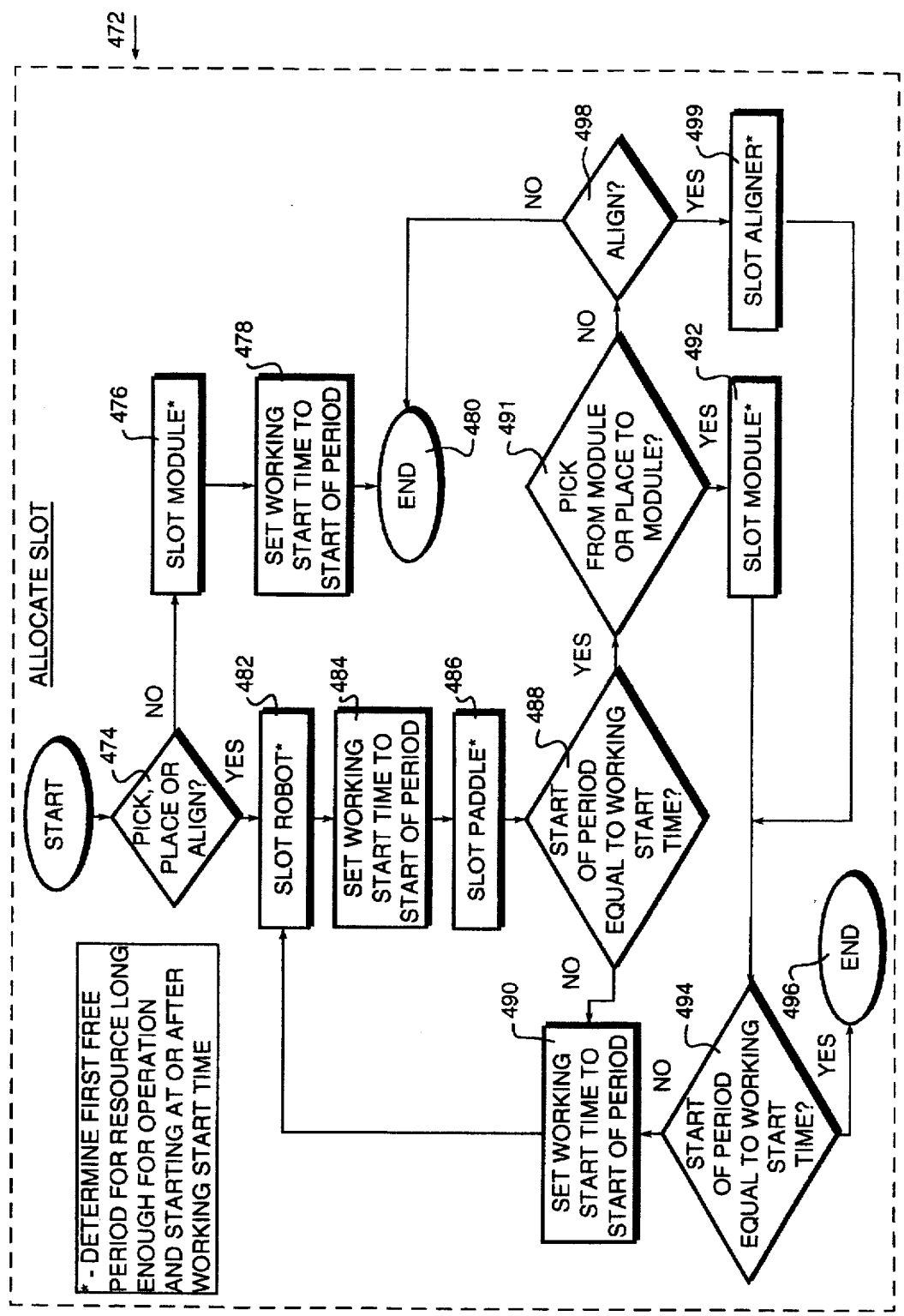
FIG. 18 is a flow diagram in which slots are allocated to the Slotting procedure flow diagram of FIG. 17.

FIG. 17 further defines the Slotting procedure used in the start time setting procedure of FIG. 16. The first operation for a wafer is addressed as indicated by block 470. Based on the first operation, the Slotting procedure calls the Allocate Slot procedure 472. With further reference to FIG. 18, the Allocate Slot procedure begins by determining whether a pick, place or align operation is called for (decision block 474). If no pick place or align is called for, then a process module is "slotted." In other words, time is allocated for use of a process module based upon the first free period of usage that is long enough to perform the specified operation at or after the working start time (block 476) and inset. After slotting a process module, the working start time is set so that the operation starts in the first free period (block 478). The Allocate Slot procedure then ends (block 480).

If the decision box 474 identifies a pick, place or align operation, then the robot is slotted (block 482). Again, the first free period long enough for performing the robot operation that starts at or after the working start time is chosen. The working start time is then set to start at that first free period according to block 484. The particular paddle (first or second in this embodiment) is then slotted in block 486. Again, the slotting of a paddle entails the identification of the first free period long enough for use of the paddle for the operation that starts at or after the working start time. The procedure then determines whether the start of the free period in which the robot and paddle are slotted is equal to the working start time (decision box 488). If the free period is not equal to the working start time, then the working start time is set to the start of the period as indicated by block 490 and the robot and paddle are then slotted (blocks 482, 484 and 486). When the start of the period equals the working start time then the decision box 488 queries whether a pick from a process module or a place to a process module will be performed by the robot in decision box 491. If either a pick or place is to be performed, then a process module is slotted as indicated by block 492. The slotting occurs similarly to the above-described block 476. When a module is slotted, the procedure queries whether the start of the free period is equal to the working start time (decision box 494). If the free period equals the working start time, then the procedure ends (block 496). If, however, the free period for the slotted module does not equal the working start time, then the working start time is set to the start of the free period as indicated by the return to block 490 and the slotting blocks 482, 484 and 486 are repeated. The slotting process relies, generally, upon an iteration of the procedure to obtain a final start time.

Referring again to decision box 491, if a pick from a process module or place to a process module is not specified, then the procedure queries whether an alignment operation is chosen in decision box 498. If an alignment is not chosen then the procedure ends (block 480). Conversely, if alignment is chosen, then the aligner is slotted (block 499). In this instance the first free period long enough for alignment is identified. The procedure then returns to the decision block 494 to determine whether the start of the free period for the aligner equals the working start time.

Referring again to FIG. 17, having allocated resources for the given operation, the start time of the operation is then set from the working start time as indicated by block 500. If this is the last operation as indicated by decision box 502, then the Slotting procedure ends (block 504). If, however, more operations are required, then the working start time is then set to the time for the end of the operation (block 506). The next operation is then addressed as indicated by block 508. The Allocate Slot procedure is then performed again using the new working start time and based upon the next operation for the wafer. Based upon the slot allocation for the next operation, the Slotting procedure then determines whether a pick is specified (decision box 510). If a pick is specified, then the procedure queries whether a paddle is allocated between the end of a previous process in a process module and the working start time (decision box 512). If the paddle is allocated, then the previous place is addressed (block 514) and the procedure returns to the Allocate Slot procedure 472. Conversely, if the paddle is not allocated between the end of the previous process and the working start time then the procedure returns to block 500 in which the start time of the operation is set from the working start time and another operation (if any) is acted upon.

Returning to decision block 510, if a pick is not specified, then the procedure queries whether a place or align is specified (decision block 516). If a place or align operation is indicated, then the procedure queries whether the allocation of the paddle between the end of the previous pick operation and the working start time has occurred (decision box 518). If such an allocation has occurred, then the previous pick is addressed (block 520) and the procedure returns to the Allocate Slot procedure 472. Conversely, if a place or align is not specified, then the procedure queries whether time exists between the end of the previous place operation and the working start time (decision box 522). If there is time between the end of the previous place operation and the working start time, then the previous place operation is addressed (block 524) and the procedure returns to the Allocate Slot procedure 472. Conversely, if there is no time between the end of the previous place operation and the working start time, then the start time of the given operation is set based upon the working start time (block 500) and the system scans for the next operation via decision block 502.

2. Shifting

In general, Shifting moves operations—so that they occur as late as possible, without skipping over previously planned operations that use the same resources. Shifting, like Slotting, relies upon iteration. In other words, the Shifting and Slotting procedures are repeated, incrementally moving the start time of the first operation to a later time. The iteration continues until the start time of the last operation is greater than the start time of the last operation from the previous iteration. The start time from the previous iteration is then restored and used.

Figure 19:
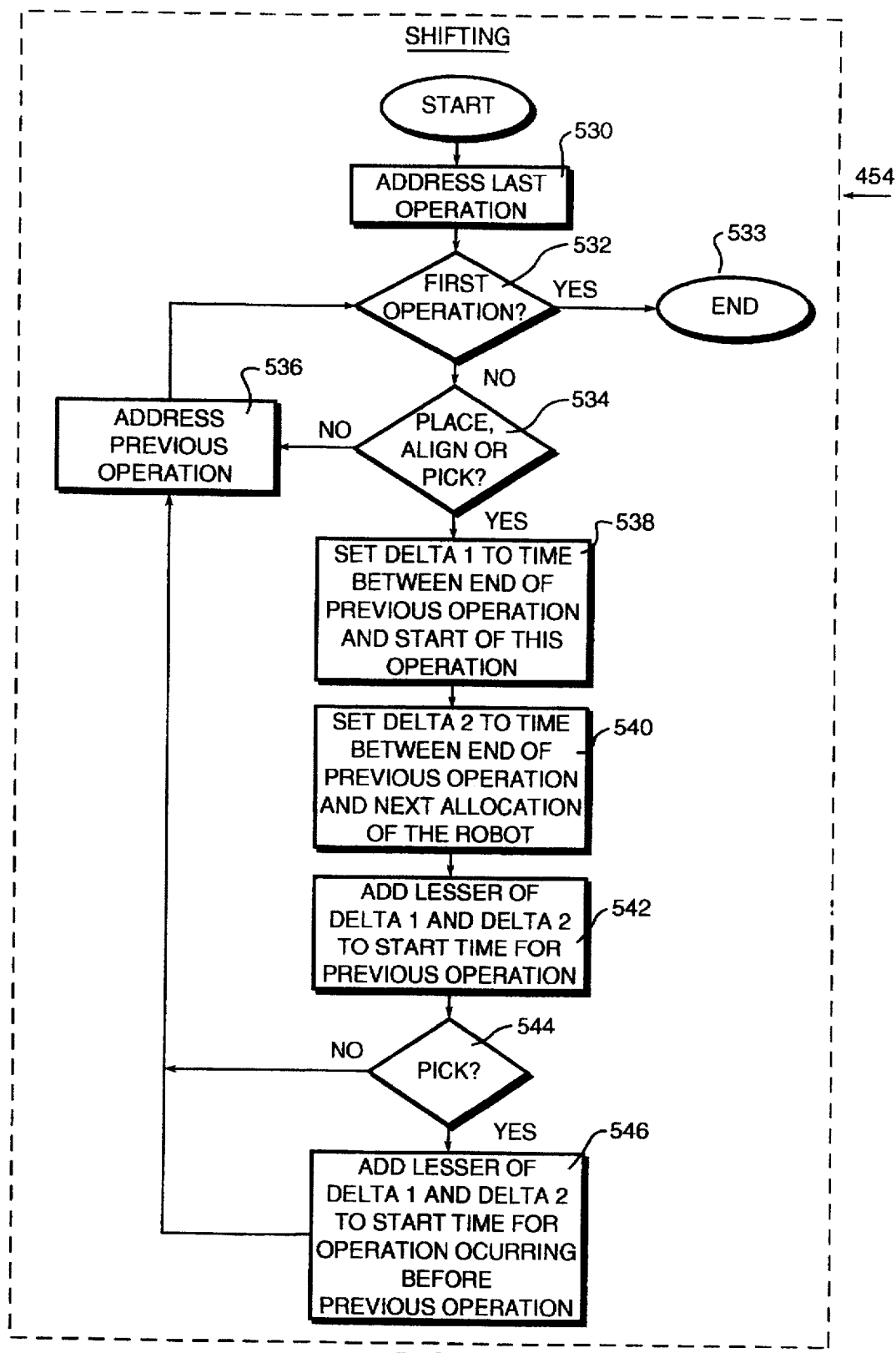
FIG. 19 is a flow diagram in which shifting occurs according to the start time setting flow diagram of FIG. 16.
Figure 20:
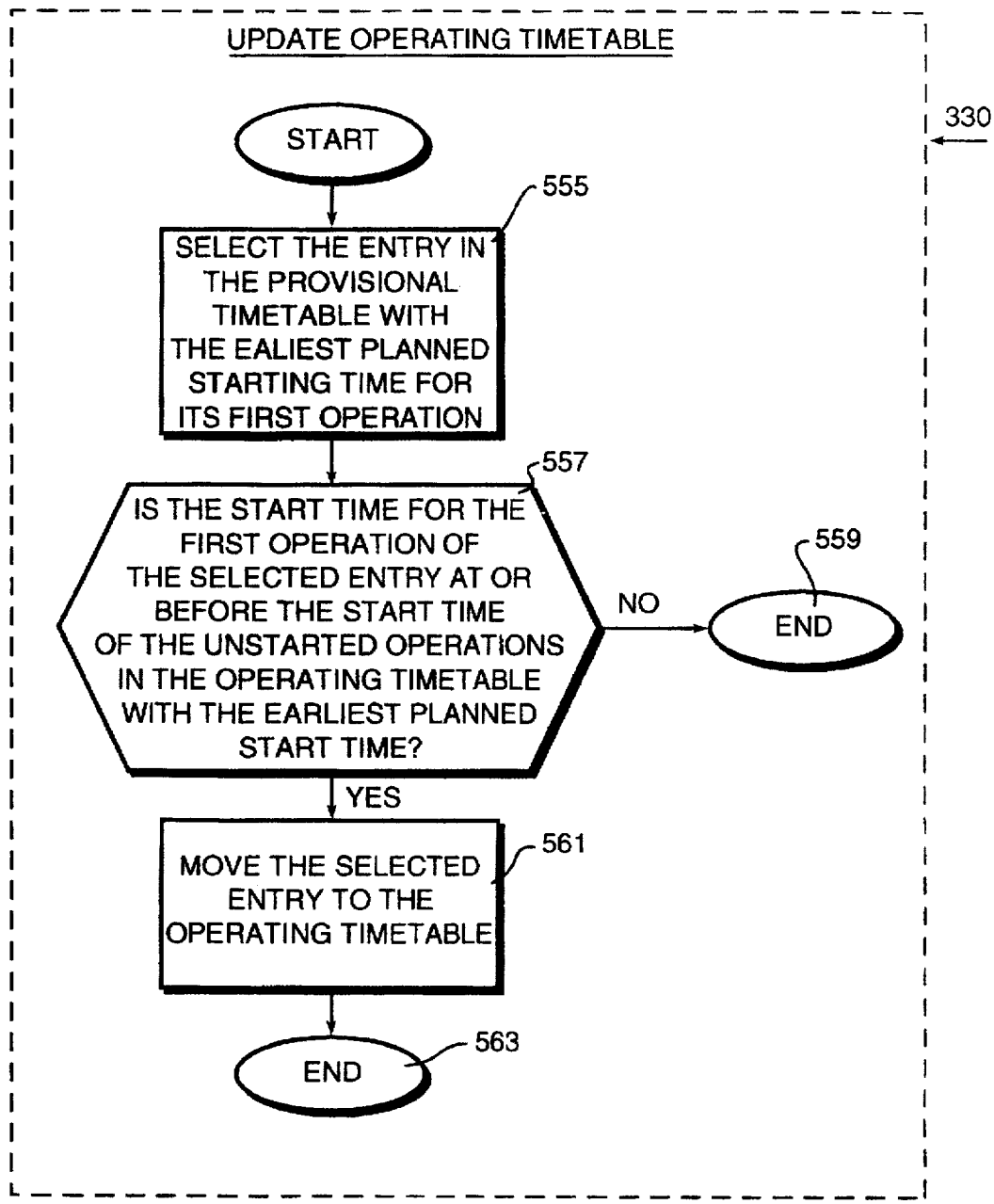
FIG. 20 is a flow diagram in which the operating timetable is updated for the planning procedure of FIG. 10.

With specific reference to the Shifting procedure, as detailed in FIG. 19, the procedure first addresses the last operation as indicated by block 530. The procedure then determines whether the addressed operation is a first operation (decision box 532). If a first operation is specified, then the procedure ends (block 533). If, however, the addressed operation is not a first operation, then the procedure queries whether a place, align or pick operation is specified (decision box 534). If the operation is not a place, align or pick, then the previous operation is addressed as indicated by block 536, and the system again queries whether the previous operation is a first operation. When a place, align or pick operation is located, the procedure sets an arbitrary variable Delta 1 to equal a time duration between the end of the previous operation and the start of the present operation (block 538). Note that the present operation in this instance can be a previous operation addressed according to block 536 and, thus, the "previous operation" for purposes of block 538 is an operation that occurs before the operation addressed by block 536.

The procedure then sets another arbitrary variable Delta 2 equal to a value for a time duration between the end of the previous operation and the next allocation of the robot (block 540). Again, for the purposes of block 540, the previous operation is an operation that comes before the currently addressed operation. The procedure then adds the lesser of Delta 1 and Delta 2 to the start time for this previous operation as indicated by block 542. In this way, the start time is shifted ahead by either Delta 1 or Delta 2. The procedure then queries whether a pick command is specified for the present operation as indicated by decision box 544. If no pick is specified, then the previous operation (relative to the current operation) is addressed via block 536. This iteration occurs until a first operation is detected by decision box 532, at which time the procedure is ended (block 534). If, however, a pick is specified then the lesser of Delta I and Delta II are added to the start time for the operation that occurs prior to the previous operation. In other words, an operation that is two operations prior to the current operation being addressed has its start time shifted. This iteration also continues until a first operation is addressed by block 536, at which time the procedure ends.

Figure 10:
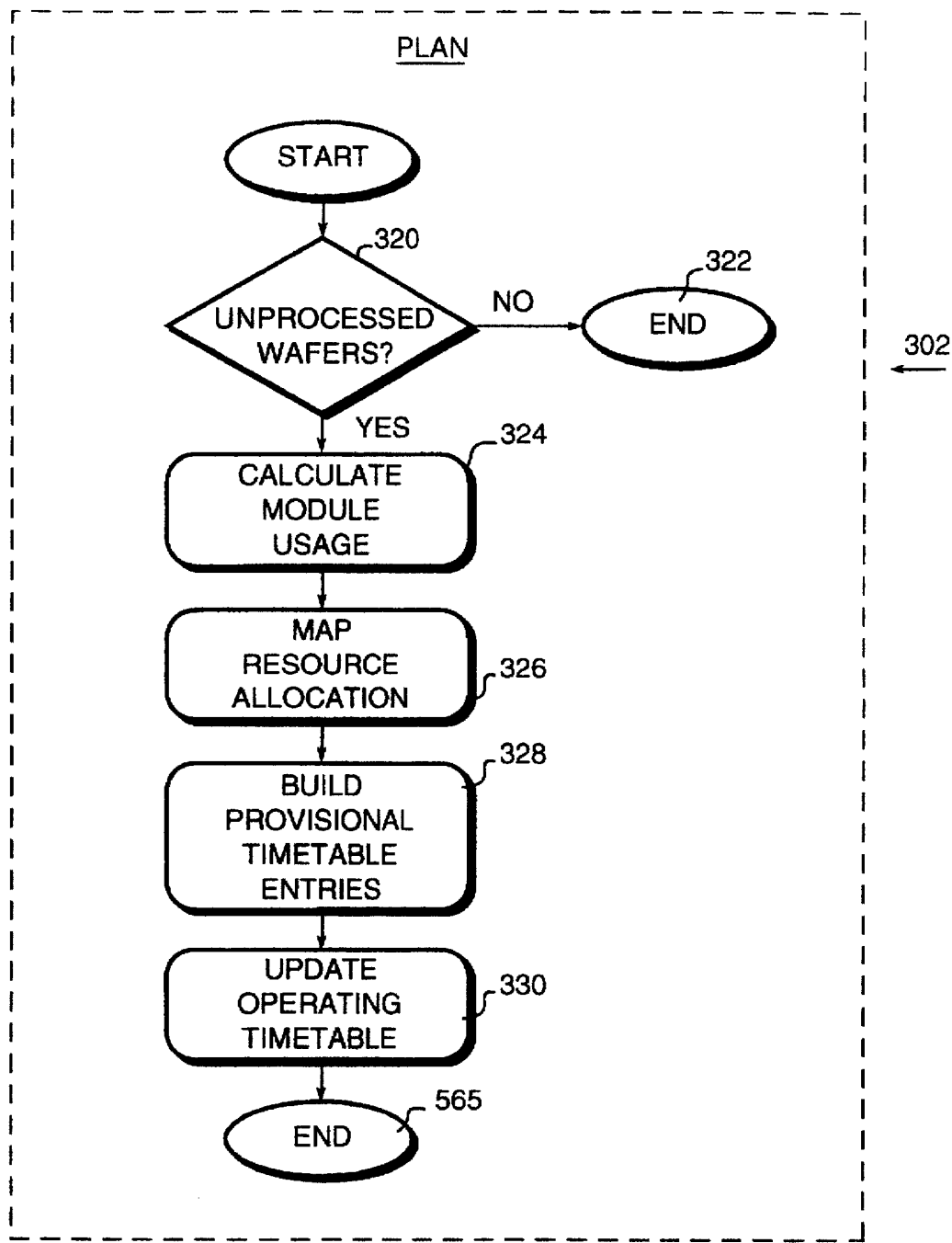
FIG. 10 is a flow diagram of the dispatch planning procedure for the overall scheduling procedure of FIG. 9.

Reference is again made to the provisional timetable entries building procedure (FIG. 10). The Set Start Times procedure, which includes the above-described Slotting and Shifting procedures, is completed for a wafer set, and as followed by the entry mapping procedure 368. The entry mapping procedure has already been described above with reference to FIG. 14. It is used in the provisional timetable entries building procedure to allocate process module and robot resources for inclusion in the planning timetable.

Following completion of the entry mapping procedure, the provisional timetable entries building procedure queries whether a concurrent processing of multiple wafer sets is specified. If not, then the procedure determines that processing will be sequential or, that the last wafer set is addressed (decision box 550). The procedure then ends (block 552). If, however, concurrent wafer sets are specified then the next wafer set is addressed as indicated in block 554 and another entry is added to the planning timetable for the next wafer of the set being addressed via block 414. The process repeats itself until an entry for the first or next wafer of each wafer set has been added to the planning timetable.

D. Update Operating Timetable

After the planning or "provisional" timetable is constructed, the actual operating timetable, upon which operations are dispatched, is updated. Updating involves the movement of provisional entries to the operating timetable for use by the main computer and dispatching operations. At most, one entry is added to the operating timetable for each execution of the Update Operating Timetable procedure. The updating procedure first selects the entry in the provisional timetable with the earliest planned starting time for its first operation (block 555). The procedure queries whether the start time for the first operation of the selected entry is at or before the start time of any unstarted operations currently within the operating timetable that have a current earliest planned start time. In other words, does the provisional entry have a start time earlier than the earliest start time of any unstarted operation listed in the operating timetable (decision box 557). If no earlier entry is located then the procedure ends (block 559). If, however, an earlier start time is identified then the selected entry is moved into the operating timetable and becomes a new earlier start time (block 561). The procedure then ends (block 563) and the planning procedure, itself, ends (block 565 in FIG. 10). The main procedure (FIG. 9) can now enter the Dispatch phase.

II. Dispatch

The Dispatch procedure causes the main control computer to communicate with the various cluster tool modules to perform movement and process operations to wafers. As described above, the first operation is initiated at the start of the production run. Subsequently, operations are initiated in response to completion of other operations and as soon as the resources needed are available, while maintaining the planned order of operations. When an operation is completed, zero, one or two new timetable operations are then initiated. An operation is initiated if its start time is less than or equal to the start time of any remaining operation and any previous operations in the timetable entry have been completed. As part of the Dispatch, the recipe to be executed by a process module is loaded to that process module. Typically, a recipe is loaded into a process module at the same time a place of the wafer to the process module occurs. To begin a process, the process module receives an Execute Recipe command subsequent to a load of the recipe.

Figure 21:
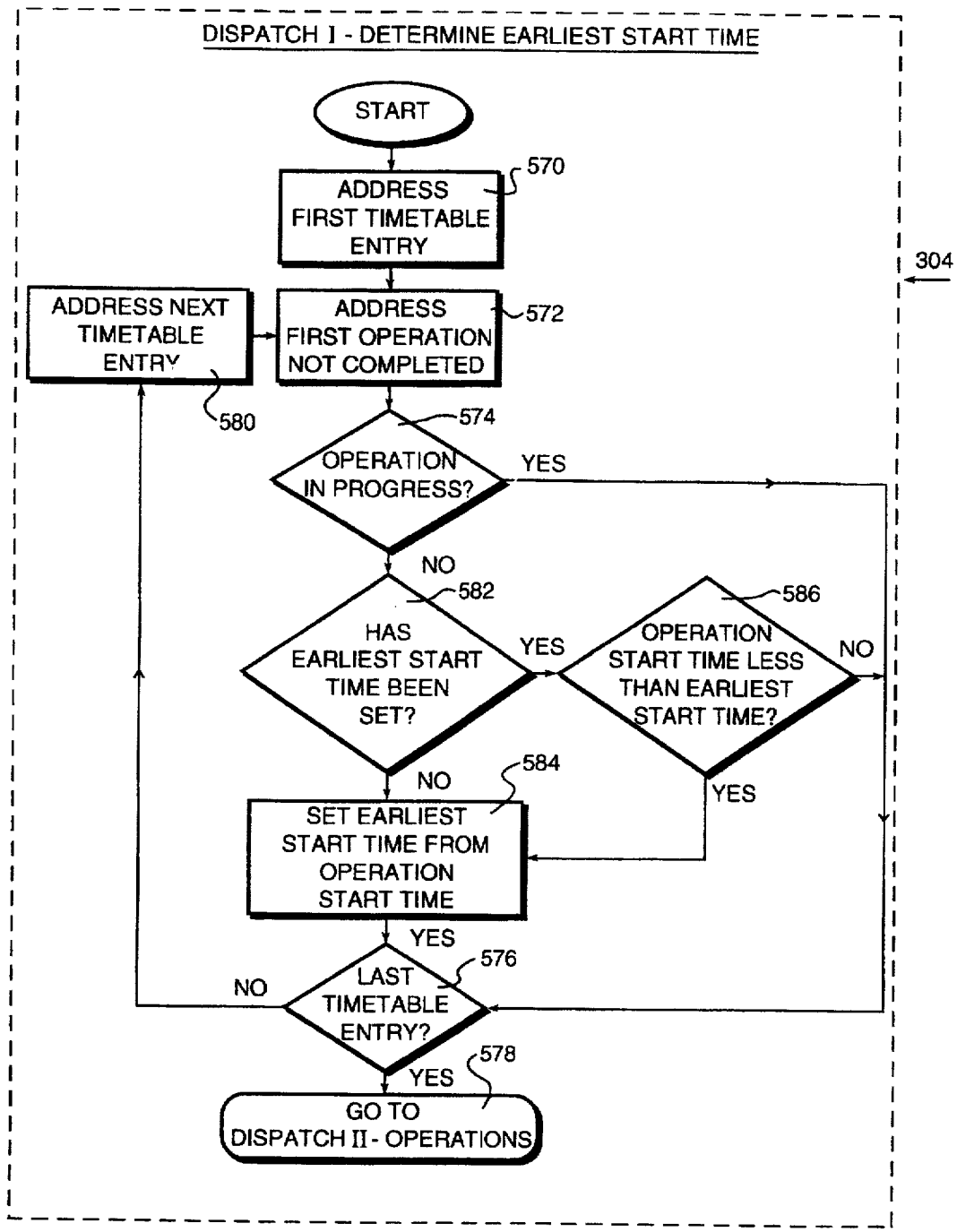
FIG. 21 is a flow diagram in which first start times for dispatch occur according to the main procedure flow diagram of FIG. 9.
Figure 22:
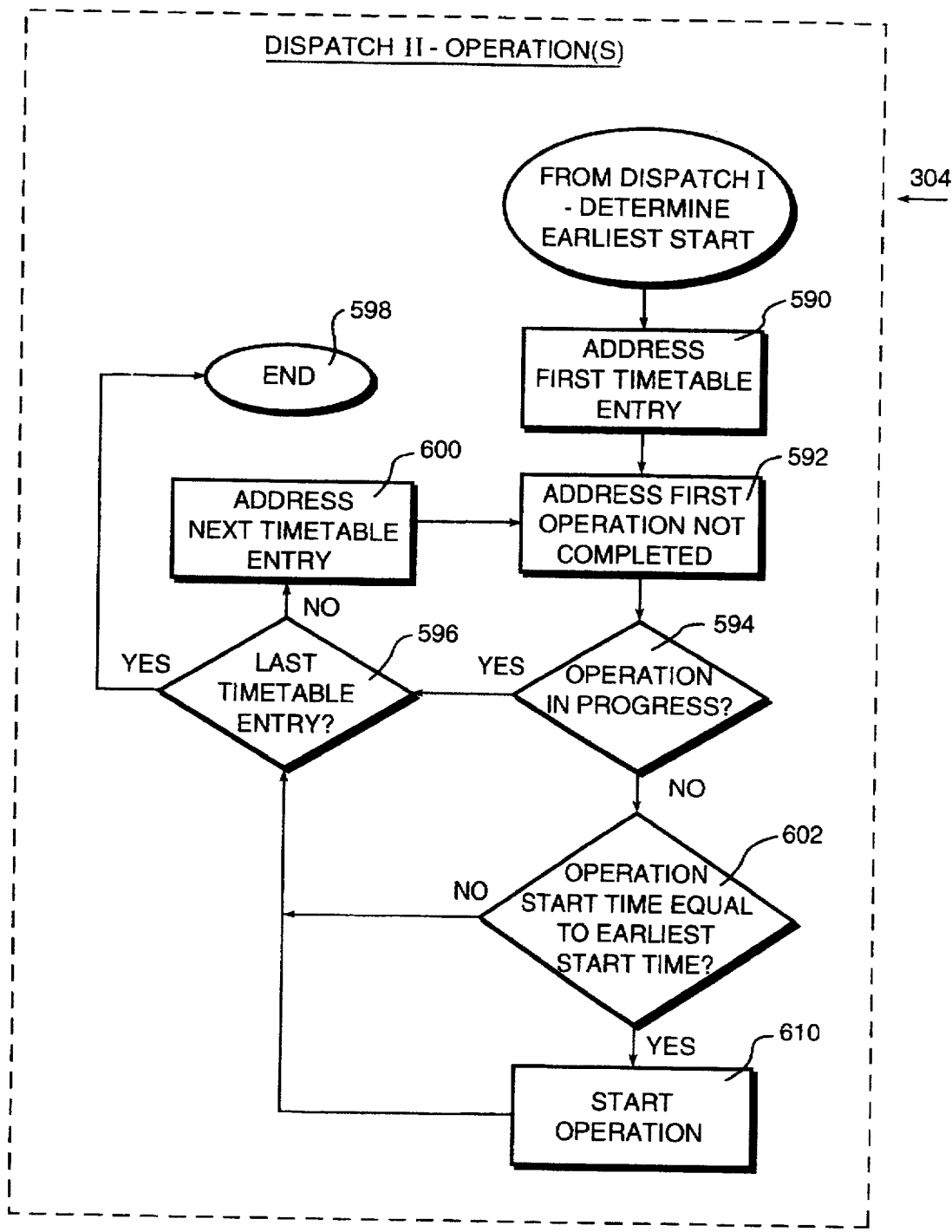
FIG. 22 is a flow diagram in which dispatch of operations occur according to the main procedure flow diagram of FIG. 9.

The Dispatch procedure is illustrated in FIGS. 21 and 22. As detailed, Dispatch consists of two separate procedures. In Dispatch I, the earliest start time, based upon each timetable entry, is determined. In Dispatch II, operations are dispatched. With reference to FIG. 21, the determination of the earliest start time is initiated by addressing the first timetable entry as indicated by block 570. The procedure then addresses the first operation not yet completed as indicated by 572. The procedure queries whether the operation is in progress (decision box 574). If the operation is in progress, then the system queries whether the last timetable entry has been addressed (decision box 576). If the last timetable entry has been addressed, then the procedure jumps to the second part of the Dispatch procedure (block 578). If the last timetable entry has not been addressed, then the procedure addresses the next timetable entry as indicated by block 580. The procedure returns to block 572 to address the first operation not completed. If an operation is not in progress (decision box 574), then the system queries whether the earliest start time has been set (decision box 582). If the earliest start time has not been set, then the earliest start time is set from the operation start time as indicated by block 584 and the system again queries whether the last timetable entry has been addressed (decision box 576). If, in decision box 582, the earliest start time has been set then the procedure queries whether the operation start time is less than the earliest start time (decision box 586). If the operation start time is not less than the earliest start time, then the procedure proceeds to decision box 576 and queries whether the last timetable entry has been addressed. If, however, the operation start time is less than the earliest start time, then the earliest start time is set from the operation start time via block 584.

At some point in the procedure, the last timetable entry is addressed and identified by decision block 576. The procedure then moves to the second part in which operations are dispatched.

With reference to FIG. 22, the first timetable entry is again addressed (block 590). The first operation not completed is also addressed (block 592). The procedure then queries whether the addressed operation is in progress (decision box 594). If the addressed operation is in progress, then the procedure queries whether the last timetable entry has been indexed (decision box 596). If the last timetable has occurred, then the procedure ends (block 598), since no further operation is to be dispatched. Conversely, if the last timetable entry has not been addressed, then the next timetable entry is addressed as indicated by block 600. The procedure again addresses the first operation not completed via block 592. When an addressed operation is not in progress, the decision box 594 instructs the procedure to query whether an operation start time equals the earliest start time (decision box 602). If the operation start time does not equal the earliest start time, then the procedure again queries whether the last timetable has been indexed via decision box 596. The procedure either loops by addressing the next timetable entry via block 600, or ends (block 598). If the operation start time is equal to the earliest start time(decision box 604), then the specified operation is started as indicated by block 610. After starting the operation, the procedure loops back to address the next timetable entry or end, depending upon the query of decision box 596.

If a pick, place or align operation is not specified (decision box 604), then the procedure queries whether a process or a process module is in progress (decision box 612). If a place or process operation is in progress, then the procedure loops back to decision box 596 and either ends or addresses the next timetable entry. Conversely, if the specified place or process is not in progress, then the place to the module or process within the module is initiated as indicated by block 610.

III. Additional Functions

As discussed briefly above, certain functions can be employed to maximize the throughput of wafers under certain conditions. Pick operations can include parameters related to Preallocation and planned delay. Process operations can also include planned delay. Planned delay generally consists of idle time on either a paddle or within a module. Preallocation is a time duration value that is normally zero. However, a pick from a process module that ends a first visit where there is more than one module for the visit may have a preallocation value equaling the sum of the pick and place operations' duration and the alignment duration. This time span provides a space for the pick and align of a subsequent wafer, allowing the flow to enter a steady state. Where a cluster tool employs four process modules and parallel processes are performed, the preallocation function improves throughput of wafers. Planned delay for a pick from a process module is the pick/place duration of the last visit to that module and twice the pick/place duration for a pick from other visits to the process module.

The planned delay for a process equals the planned duration for the longest process in the entry for the wafer minus the planned duration for the current process which the wafer is undergoing.

The delay following a pick allows space for a place operation for a subsequent wafer during a swap. For serial processing of wafers, it allows for double swaps. The delay following a process ensures that double swaps are scheduled. The implementation of preallocation and planned delays during Slotting and Shifting functions are defined as follows:

For a Pick the robot and the robot paddle to be used are required during the preallocation period and the paddle is required during the planned delay (i.e. the time duration value for [Start Time–Preallocation] through [Start Time +Planned Duration] does not overlap an allocation period for the robot and the time duration value for [Start Time–Preallocation] through [Start Time+Planned Duration+Planned Delay] does not overlap an allocation period for the paddle).

For a Process, the robot and the robot paddle to be used are required during the preallocation period and the paddle is required during the planned delay (i.e. the time duration value for [Start Time–Preallocation] through [Start Time+Planned Duration] does not overlap an allocation period for the robot and the time duration for [Start Time Preallocation] through [Start Time+Planned Duration+Planned Delay] does not overlap an allocation period for the paddle).

The foregoing has been a detailed description of a preferred embodiment. Various modifications and additions can be made without departing from the spirit and scope of this invention. For example, as noted above, while wafers and alignment operations are described, the scheduling method of this invention can be employed with more generalized objects in any robotic manufacturing environment in which handlers and process modules are limited in number and availability. It is contemplated that further modules, other than aligners, process modules and cooling modules can be employed, and that appropriate time entries can be provided for such modules. In general, all modules described herein can be treated as process modules having a certain time duration. Further steps such as module cleaning and gas introduction/extraction can also be part of the schedule. In some instances the time durations are fixed and known. In other instances time durations are variable. It is further contemplated that additional optimization features can be added to the method described herein. Accordingly, this description is meant to be taken only by way of example and not to otherwise limit the scope of the invention.

What is claimed is:

1. A method for planning and controlling a processing of a group of objects by a cluster tool, the cluster tool having resources that respectively include each of a plurality of process modules, each of the process modules performing a desired process on selected objects of the group of objects while each of the selected objects are located in each of the process modules, the resources further including a manipulator that, on a plurality of respective carrying paddles, carries and moves the objects into and out of the process modules in a series of discrete movements, the carrying paddles and the process modules each defining a single respective object location, each object location being constructed and arranged to have located thereat only one object of the group of objects at any time, operations being performed by the resources on the objects, wherein the operations each occur to a single one of the objects using predetermined resources of the resources and occurring at corresponding predetermined of the object locations, the operations each having an operation time period defined by a predetermined operation start time and an operation time duration, each object having a sequence of operations performed thereupon including (a) an initial operation of moving the related object to one of the paddles from an initial location, (b) a final operation of moving the related object to a final location from one of the paddles and (c) intervening operations between the initial operation and the final operation, wherein there are a plurality of sets of the operations each respectively performed upon each related object and, by each of the sets of the operations, each related object is moved from one of the paddles on which it is located to a desired process module, the related object is processed by the desired process module and the related object is moved from the desired process module to one of the paddles, the object locations being occupied by respective objects for a respective occupancy time period, each occupancy time period starting at a start of an operation that moves an object to the object location and ending at an end of an earliest subsequent operation that moves the object from the object location, the method comprising the steps of:

1. planning discrete movements and processing each object of the group of objects, in turn, in desired process modules, the step of planning, for each of the object, including:
   A. assigning operation start times for operations in a sequence of operations related to the object, including:
      i. setting each operation start time for the related object so that the operation start time follows an immediately preceding operation time period for the related object;
      ii. setting each operation start time for the related object so that, for each resource to be used for the respective operation, the operation time period is free of overlap with all previously set operation time periods for operations using the same resource for other objects;
      iii. setting each operation start time for the related object so that, for each specific operation location for a respective operation, the operation time period is free of overlap with any previously set occupancy time period for the specific operation location for operations performed upon other objects, and
      iv. setting each operation start time to start as early as possible based upon each of steps 1A(i) and 1A(ii) and 1A(iii);
   B. i. interrupting each of steps 1A(i), 1A(ii), 1A(iii) and 1A(iv) when an operation start time (T), for a respective operation-to-be-set (OP2), for the related object that includes a sequence of operations having at least a first operation (OP1) through a last operation (OP2), wherein OP1 is a movement of a selected object (O) to a selected object location (L) and OP2 is a subsequent removal of O from L, is set so that an operation time period for a prior operation at L for another object overlaps any time from an end of OP1 to a start of OP2, and thereafter,
      ii. restarting step 1A from OP1 with the operation start time of OP1 not less than T;
   C. after all desired operation start times are set in steps A and B, revising the operation start times for all previously set operations in reverse order from a next-to-last operation to a first operation by adding the lesser of:
      i. a time duration from the end of the operation time period of an operation start time being revised to an operation start time of a earliest subsequent operation time period for the related object and
      ii. a time duration from an end of the operation time period of the operation start time being revised to the operation start time of an earliest subsequent operation time period for a previously planned operation for another object using any of the same resources as used by the operation with the revised operation start time;
   D. repeating steps 1A, 1B, and 1C, each time setting the operation start time of the first operation for the related object to be greater than the operation start time of the first operation set in an immediately preceding set of steps 1A, 1B, and 1C until the operation start time for the last operation for the related object changes relative to the operation start time for the last operation in the immediately preceding set of steps 1A, 1B and 1C, and setting each of the operation start times in the sequence of operations for the next related object as the corresponding operation start times from the immediately preceding steps 1A, 1B and 1C; and 2. controlling the sequence of operations related to each of the objects in the group of objects including:
   A. initiating each of the operations in the sequence in an order of the operation start time assigned in step 1 and initiating the operations simultaneously if respective assigned operation start times thereof are the same as each other; and
   B. if the assigned operation start times of respective operations are different from each other, then initiating the operations with different operation start times, free of dependence upon the respective assigned operation start times, when both of (a) all preceding operations on the same object have ended and (b) all preceding operations using the same resource have ended.

2. The method as set forth in claim 1 wherein there are at least a first plurality of objects and a second plurality of objects in the group of objects wherein all objects in each of the first plurality of objects have identical respective first sets of operations performed thereupon and all objects in each of the second plurality of objects have identical respective second sets of operations performed thereupon and wherein the first sets of operations differ from the second sets of operations.

3. The method as set forth in claim 2 wherein the second plurality of objects is planned by the step of planning while the first plurality of objects is being processed by the step of controlling, the step of planning being performed incrementally during the step of controlling including, when a plurality of objects is added for processing and when a current operation completes:
   a. selecting each plurality of objects in a descending order of usage that a next object of each plurality makes upon a resource with a greatest remaining usage by all of the objects in all the pluralities of objects,
   b. provisionally assigning operation start times according to the step of assigning (A) to the next object of each plurality, the operations for objects of previously selected pluralities of objects being previously planned operations,
   c. selecting an object with an earliest provisional operation start time to define the operation start time for the respective object and discarding any remaining provisional operation start times for other objects, and
   d. if the provisional operation start time for a first operation of the selected object is not greater than the operation start time for any previously planned operations that have not started, then confirm all starting times for the selected object, else discard all starting times for the selected object.

4. The method as set forth in claim 1 wherein the step of controlling includes measuring durations of predetermined operations and storing averaging durations for the predetermined operations.

5. The method as set forth in claim 4 wherein the step of planning includes employing the average durations as the durations of operation time periods for operations that are the same as the predetermined operations.

6. The method as set forth in claim 1 wherein at least two of the process modules are constructed and arranged to perform an identical process on the objects and the step of planning includes setting operation start times for the objects so that objects that require an operation that uses the same process module are set, in turn.

7. The method as set forth in claim 1 further comprising operating the manipulator to move two paddles that are opposed to each other and that rotate on a common axis and that each move independently, radially relative to the axis, the process modules being located about the axis, the step of planning including grouping process modules at predetermined times so that each of the two paddles is located adjacent two respective process modules between which objects are to be moved.

8. The method as set forth in claim 1 wherein the step of planning includes establishing predetermined delay times between operation time periods using specific of the resources based upon usage of the specific resources so that predetermined others of the resources are used on a more continuous basis.

9. The method as set forth in claim 1 wherein the step of planning includes establishing predetermined preallocation time periods that occur before operation time periods using specific of the resources wherein the preallocation time periods are free of overlap with operation time periods for operations using the specific resources for previously planned objects, so that predetermined of the resources are used on a more continuous basis.

10. The method as set forth in claim 1 wherein the objects comprise semiconductor wafers and the process modules comprise semiconductor fabrication processors.

11. The method as set forth in claim 10 wherein the resources include an aligner module for aligning each of the wafers relative to one of the carrying paddles, and wherein one of the operations comprises moving wafers to the aligner module, aligning the wafers, and moving each of the wafers from the aligner module to one of the process modules.

12. The method as set forth in claim 11 further comprising operating the manipulator to move two paddles that are opposed to each other and that rotate on a common axis and that each move independently, radially relative to the axis, the process modules being located about the axis, the step of planning including grouping process modules at predetermined times so that each of the two paddles is located adjacent two respective process modules between which objects are to be moved.

* * * * *